(12) United States Patent
Bors et al.

(10) Patent No.: US 8,562,831 B2
(45) Date of Patent: Oct. 22, 2013

(54) WATER FILTER ASSEMBLY

(75) Inventors: Mark S. Bors, Grafton, OH (US); Todd C. Loschelder, Macedonia, OH (US); Sanjeev S. Moghe, Chagrin Falls, OH (US); Yaakov Korb, Grafton, OH (US); Matthew S. Smith, North Ridgeville, OH (US); Allen L. Talley, Hudson, OH (US); W. Randall Tucker, Oberlin, OH (US)

(73) Assignee: Moen Incorporated, North Olmsted, OH (US)

( * ) Notice: Subject to any disclaimer, the term of this patent is extended or adjusted under 35 U.S.C. 154(b) by 1301 days.

(21) Appl. No.: 11/651,342

(22) Filed: Jan. 9, 2007

(65) Prior Publication Data

US 2007/0199880 A1 Aug. 30, 2007

Related U.S. Application Data

(60) Provisional application No. 60/757,579, filed on Jan. 10, 2006.

(51) Int. Cl.
| | |
|---|---|
| *B01D 35/30* | (2006.01) |
| *B01D 27/00* | (2006.01) |
| *B01D 27/08* | (2006.01) |
| *B01D 35/00* | (2006.01) |
| *B01D 35/28* | (2006.01) |
| *B01D 29/00* | (2006.01) |

(52) U.S. Cl.
USPC ........... 210/235; 210/232; 210/234; 210/236; 210/238; 210/435; 210/437; 210/440; 210/443; 210/455; 210/457

(58) Field of Classification Search
None
See application file for complete search history.

(56) References Cited

U.S. PATENT DOCUMENTS

| | | | |
|---|---|---|---|
| 2,568,181 A | 9/1951 | Zimmerman et al. | |
| 3,358,839 A | 12/1967 | Simons | |
| 4,735,716 A | 4/1988 | Petrucci et al. | |
| 4,781,830 A | 11/1988 | Olsen | |
| 4,806,240 A | 2/1989 | Giordano et al. | |
| 4,877,521 A | 10/1989 | Petrucci et al. | |
| 4,882,061 A | 11/1989 | Petrucci et al. | |
| 4,904,382 A | 2/1990 | Thomsen | |
| 4,915,831 A | 4/1990 | Taylor | |
| 4,948,505 A | 8/1990 | Petrucci et al. | |
| 4,956,086 A | 9/1990 | Thomsen et al. | |
| D317,040 S | 5/1991 | Petrucci et al. | |
| 5,035,797 A | 7/1991 | Janik | |
| D322,836 S | 12/1991 | Petrucci et al. | |
| 5,130,020 A | 7/1992 | Meckstroth | |
| 5,186,829 A | 2/1993 | Janik | |
| 5,259,953 A | 11/1993 | Baracchi et al. | |

(Continued)

*Primary Examiner* — Benjamin Kurtz
(74) *Attorney, Agent, or Firm* — Calfee, Halter & Griswold LLP

(57) ABSTRACT

A water filtration system includes a faucet assembly and a filtration assembly. The filtration assembly includes a filter assembly; a filter bracket or mounting assembly for securing the filter assembly to a support surface or structure; and a filter manifold assembly including an unfiltered water inlet for connecting to an unfiltered water supply and a filtered water outlet for connecting to a valve assembly of the faucet assembly. The filter assembly interfaces with the filter manifold assembly to provide filtered water to the faucet assembly under control of the valve assembly. A filter that otherwise would not interface with the filter bracket/mounting assembly and/or the filter manifold assembly can be adapted to work in the water filtration system by using a filter adaptor assembly.

16 Claims, 18 Drawing Sheets

(56) References Cited

U.S. PATENT DOCUMENTS

| | | |
|---|---|---|
| 5,336,406 A | 8/1994 | Stanford et al. |
| 5,354,464 A | 10/1994 | Slovak et al. |
| D356,625 S | 3/1995 | Petrucci et al. |
| 5,456,830 A | 10/1995 | Stanford et al. |
| 5,486,288 A | 1/1996 | Stanford et al. |
| 5,826,854 A * | 10/1998 | Janvrin et al. ............... 251/149.9 |
| 5,830,371 A | 11/1998 | Smith et al. |
| 5,837,137 A | 11/1998 | Janik |
| 5,914,037 A | 6/1999 | Yen |
| 5,961,824 A | 10/1999 | Caiozza |
| 6,001,249 A | 12/1999 | Bailey et al. |
| 6,027,644 A | 2/2000 | Magnusson et al. |
| 6,120,685 A | 9/2000 | Carlson et al. |
| 6,187,188 B1 | 2/2001 | Janik et al. |
| 6,193,884 B1 | 2/2001 | Magnusson et al. |
| 6,303,031 B1 | 10/2001 | Senner |
| 6,325,929 B1 | 12/2001 | Bassett |
| D455,814 S | 4/2002 | Magnusson et al. |
| 6,426,001 B1 | 7/2002 | Fritze |
| 6,458,269 B1 | 10/2002 | Bassett et al. |
| 6,488,848 B1 | 12/2002 | Smith |
| D472,299 S | 3/2003 | Fritze |
| 6,533,931 B1 | 3/2003 | Reid |
| D472,604 S | 4/2003 | Fritze |
| 6,540,914 B1 | 4/2003 | Smith |
| 6,576,129 B1 | 6/2003 | Reid |
| 6,649,056 B2 | 11/2003 | Fritze |
| 6,695,891 B2 | 2/2004 | Reid |
| 6,755,308 B2 | 6/2004 | Janik et al. |
| 6,966,986 B1 * | 11/2005 | Lackey ........................ 210/234 |
| 6,977,039 B2 * | 12/2005 | Knoll et al. .................... 210/232 |
| 7,237,682 B2 | 7/2007 | Reynolds et al. |
| 2002/0017497 A1 | 2/2002 | Fritze |
| 2002/0043491 A1 | 4/2002 | Janik et al. |
| 2002/0121469 A1 | 9/2002 | Garber |
| 2002/0185425 A1 | 12/2002 | Bassett et al. |
| 2003/0024568 A1 | 2/2003 | Bowman |
| 2003/0042192 A1 | 3/2003 | Nam et al. |
| 2003/0132153 A1 | 7/2003 | Jelten |
| 2003/0141235 A1 | 7/2003 | Stankowski et al. |
| 2003/0196948 A1 | 10/2003 | Bassett et al. |
| 2004/0084360 A1 | 5/2004 | Janik |
| 2004/0084361 A1 | 5/2004 | Janik et al. |
| 2004/0084362 A1 | 5/2004 | Janik |
| 2004/0084363 A1 | 5/2004 | Janik |
| 2004/0144710 A1 | 7/2004 | Bassett et al. |
| 2004/0144713 A1 | 7/2004 | Bassett et al. |
| 2004/0182777 A1 | 9/2004 | Stankowski et al. |
| 2006/0108277 A1 | 5/2006 | Fall et al. |
| 2006/0186036 A1 | 8/2006 | South et al. |
| 2007/0095744 A1 | 5/2007 | Bagci et al. |

* cited by examiner

WATER FILTER ASSEMBLY

RELATED APPLICATION

The present application is being filed as a non-provisional patent application claiming priority/benefit under 35 U.S.C. §119(e) from U.S. Provisional Patent Application No. 60/757,579 filed on Jan. 10, 2006.

FIELD

The invention relates generally to a water filtration system and, more particularly, to a water filter assembly for use in the water filtration system.

BACKGROUND

Tap water often includes impurities such as minerals, chlorine, particulates and other contaminants that affect the taste, odor, appearance and health quality of the water. To remove such impurities, water filtration devices are becoming increasingly utilized for filtering tap water.

SUMMARY

In view of the above, a water filtration system is provided that includes a faucet assembly and a filtration assembly. The faucet assembly comprises a spout assembly including a first water outlet and a second water outlet; a first valve assembly for connecting to an unfiltered hot water supply and an unfiltered cold water supply and operable to control delivery of unfiltered water to the first water outlet of the spout assembly; and a second valve assembly for connecting to a filtered water outlet of the filtration assembly and operable to control delivery of filtered water to the second water outlet of the spout assembly. A waterway between the first valve assembly and the first water outlet is separate from a waterway between the second valve assembly and the second water outlet. Accordingly, there is no possibility of cross contamination between the unfiltered water and the filtered water. The filtration assembly comprises a filter assembly; a filter bracket or mounting assembly for securing the filter assembly to a support surface or structure; and a filter manifold assembly including an unfiltered water inlet for connecting to an unfiltered water supply and the filtered water outlet for connecting to the second valve assembly. A filter adaptor assembly may be used to adapt a different filter assembly to the filter bracket assembly and/or the filter manifold assembly.

Numerous advantages and features will become readily apparent from the following detailed description of exemplary embodiments, from the claims and from the accompanying drawings.

BRIEF DESCRIPTION OF THE DRAWINGS

The invention as well as embodiments and advantages thereof are described below in greater detail, by way of example, with reference to the drawings in which.

DETAILED DESCRIPTION

Figure 1:
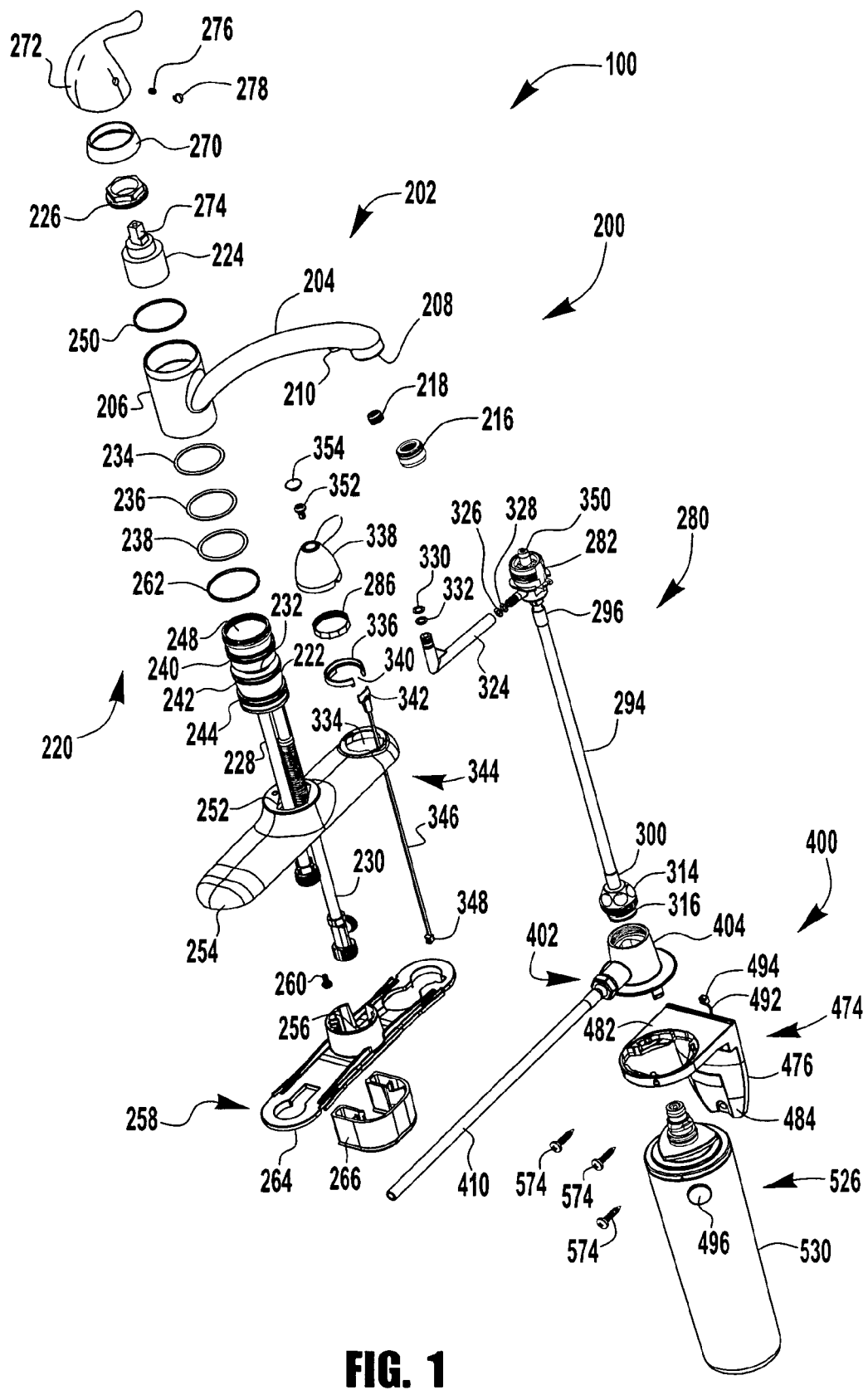
FIG. 1 is an exploded perspective view of a water filtration system, according to an exemplary embodiment.

While the general inventive concept is susceptible of embodiment in many different forms, there are shown in the drawings and will be described herein in detail specific embodiments thereof with the understanding that the present disclosure is to be considered as an exemplification of the principles of the general inventive concept. Accordingly, the general inventive concept is not intended to be limited to the specific embodiments illustrated herein.

Figure 2:
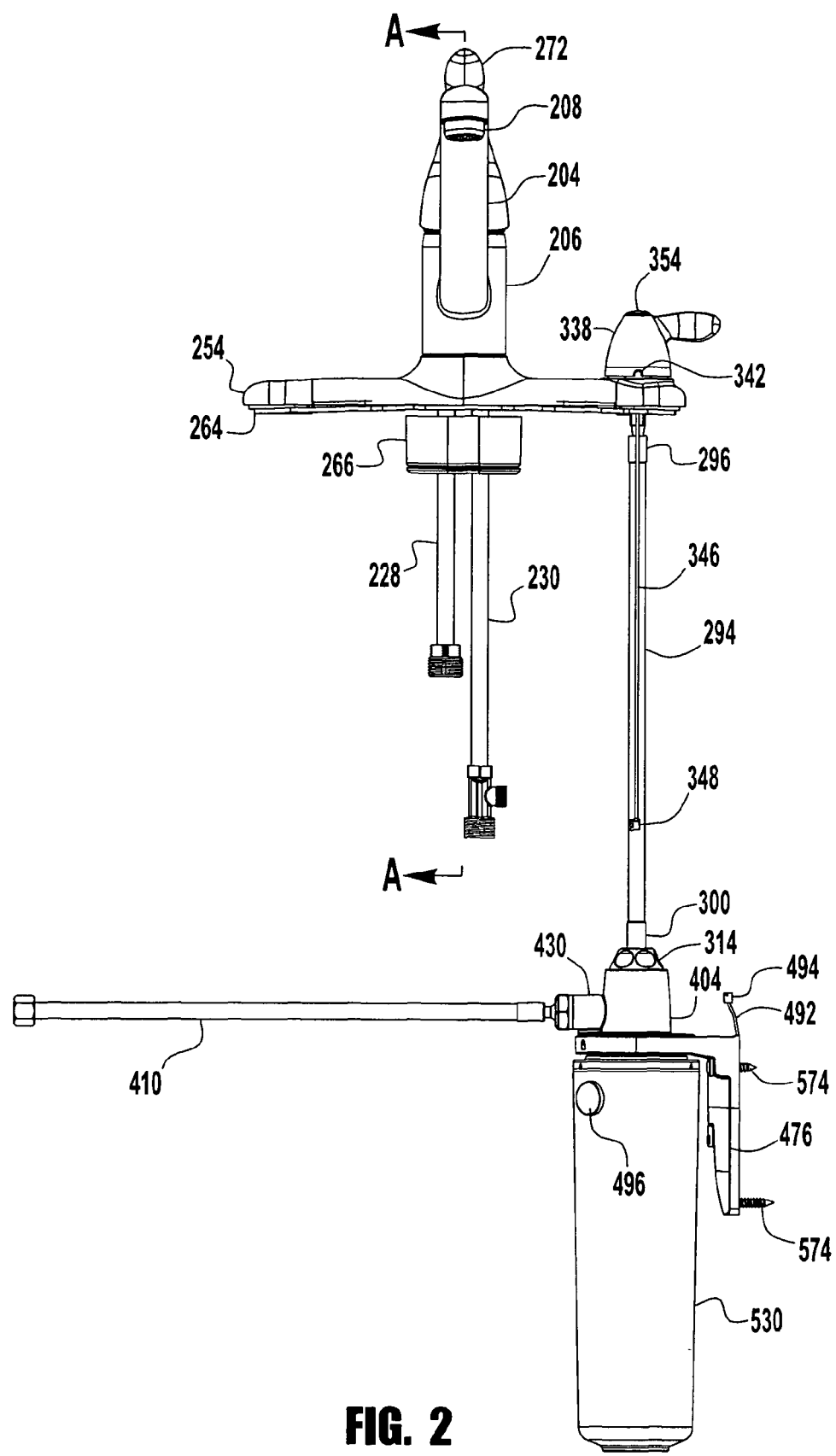
FIG. 2 is a front view of the water filtration system of FIG. 1.
Figure 3:
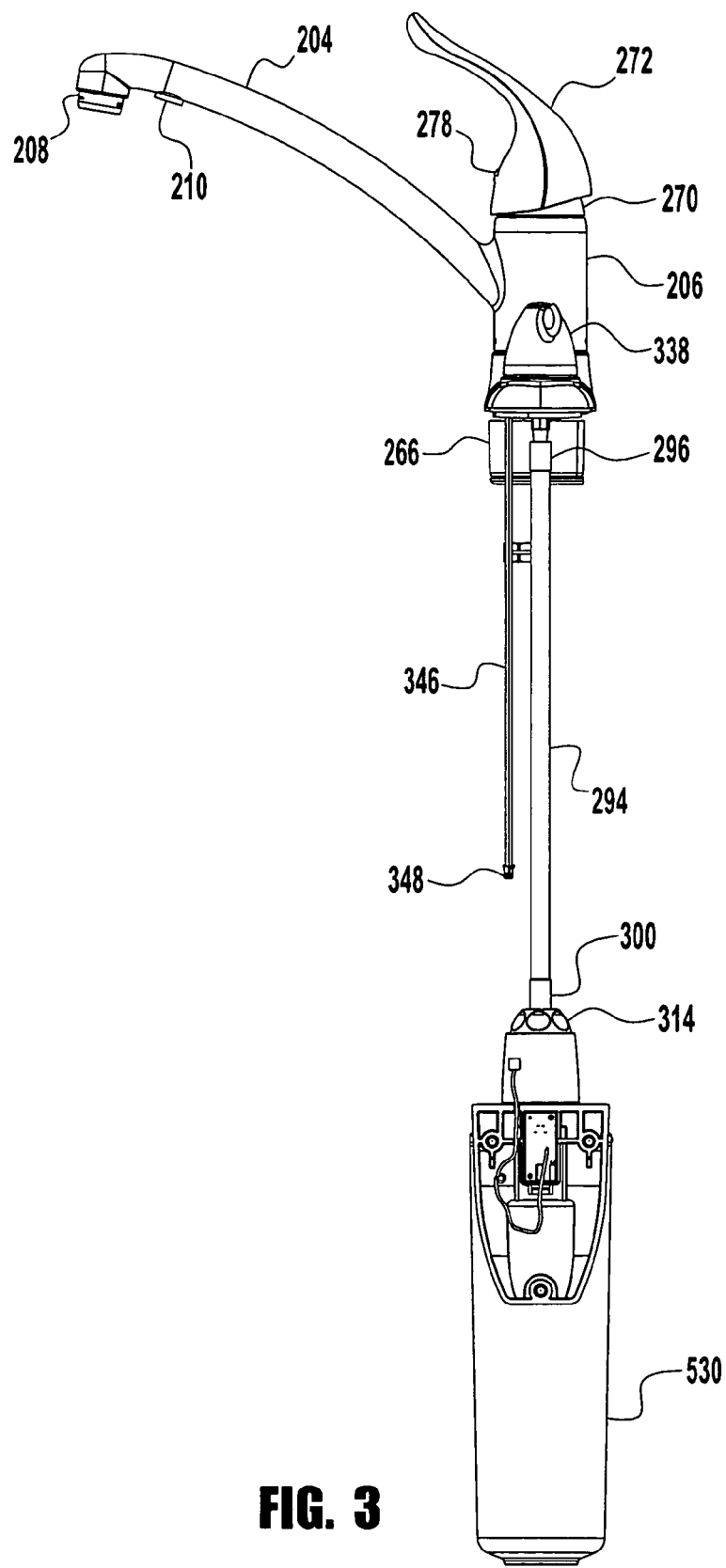
FIG. 3 is a right side view of the water filtration system of FIG. 1.
Figure 4:
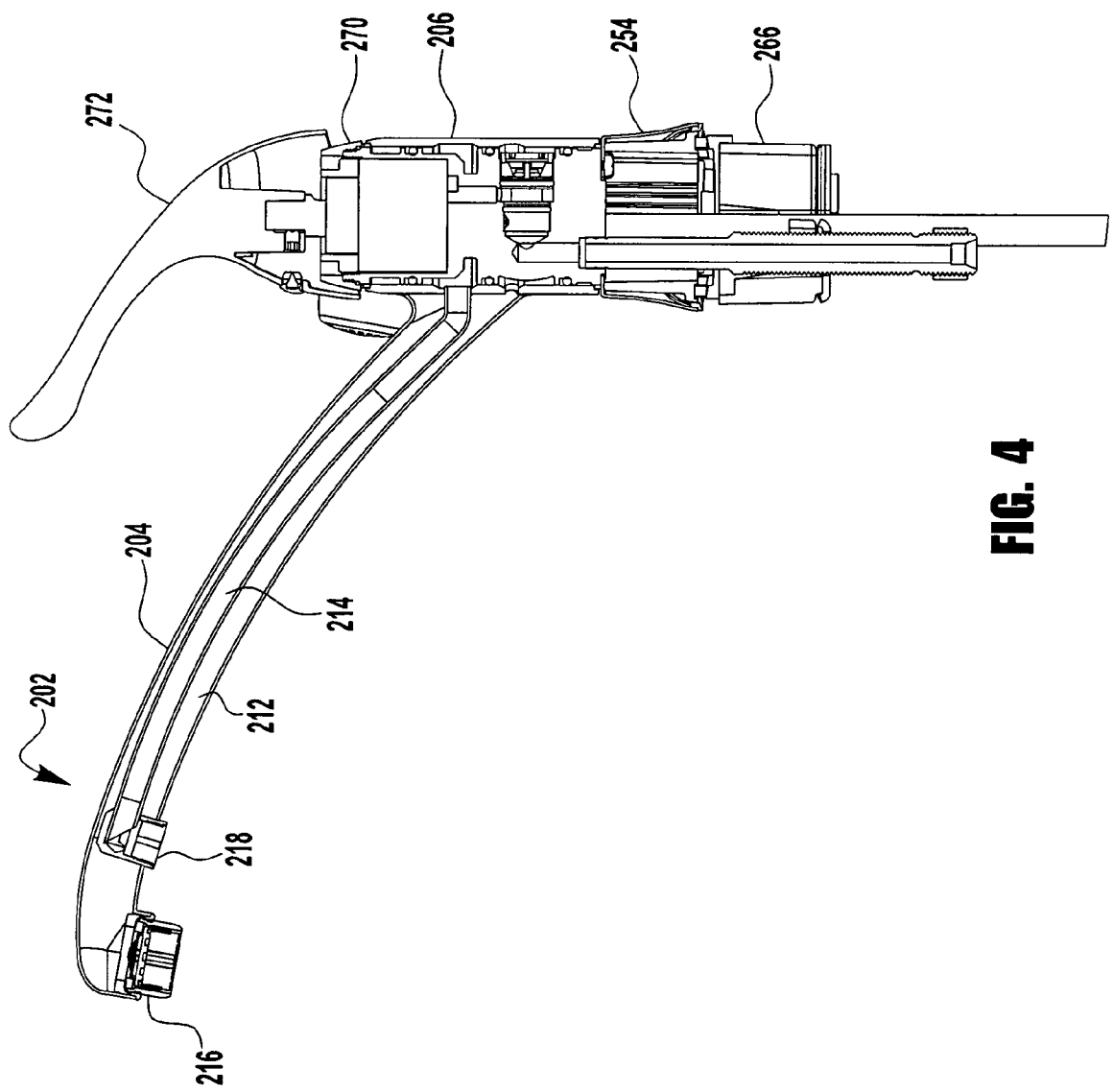
FIG. 4 is a cross-sectional view of an upper portion of a faucet assembly along line A-A in FIG. 2.

Referring to FIG. 1, a water filtration system 100 according to an exemplary embodiment is shown as an exploded view. A front view of the water filtration system 100 is illustrated in FIG. 2 and a right side view of the water filtration system 100 is illustrated in FIG. 3. FIG. 4 shows a cross-sectional view of an upper portion of the water filtration system 100 along line A-A of FIG. 2.

The water filtration system 100 includes a faucet assembly 200 and a filtration assembly 400. Preferably, but not necessarily, the filtration assembly 400 is installed below the faucet assembly 200. For example, the filtration assembly 400 may be installed below a sink deck (not shown) on which the faucet assembly 200 is mounted.

The faucet assembly 200 includes a spout assembly 202, a first valve assembly 220 and a second valve assembly 280.

The spout assembly 202 includes a spout 204 extending from a spout hub 206. The spout 204 includes a spout tip 208, a filter tip 210, a spout tube 212 and a filter tube 214. The spout tube 212 and filter tube 214 can be seen in FIG. 4.

The spout tip 208 defines a first water outlet through which unfiltered water may flow out of the spout 204. The filter tip 210 defines a second water outlet through which filtered water may flow out of the spout 204. The spout tube 212 defines a first waterway through the spout 204 and the filter tube 214 defines a second waterway through the spout 204. Preferably, but not necessarily, the filter tube 214 is disposed within the spout tube 212, as shown in FIG. 4. In an alternative embodiment, a diverter assembly (not shown) is provided for diverting at least one of said unfiltered water and said filtered water from said spout assembly 202, for example, to a side spray assembly (not shown).

Preferably, but not necessarily, an aerator assembly 216 is connected to the spout tip 208 to introduce air into the unfiltered water flowing out of the spout tip 208. The aerator assembly 216 may reduce splashing, while increasing areas of coverage and wetting efficiency.

Preferably, but not necessarily, a stream straightener 218 is connected to the filter tip 210 to straighten the flow of filtered water flowing out of the filter tip 210. For example, filtered water flowing through the stream straightener 218 becomes laminar, which provides a pleasant look and feel. In one exemplary embodiment, a flow rate of the filtered water discharged through the filter tip 210 is between 0.9 and 1.1 gallons per minute, inclusive.

The first valve assembly 220 includes a first valve body 222, a first valve 224 and a first valve retaining nut 226. The first valve body 222 includes a hot water supply tube 228, a cold water supply tube 230 and a water outlet 232. The first valve body 222 includes a cavity 248 for receiving the first valve 224. The first valve 224 controls the amount of hot water and cold water to be mixed and delivered to the spout 204 via the water outlet 232 for output at the spout tip 208. The first valve 224 may be a cartridge-type valve assembly.

The first valve body 222 containing the first valve 224 is disposed in the spout hub 206 of the spout assembly 202. O-rings 234, 236 and 238 are located in grooves 240, 242 and 244, respectively, on an exterior of the first valve body 222 to form seals between the exterior surface of the first valve body 222 and an interior surface of the spout hub 206. The first valve retaining nut 226 is connected (e.g., via threaded surfaces) to the first valve body 222 to secure the first valve 224 and the first valve body 222 within the spout hub 206. A bearing washer 250 may be located between the spout hub 206 and the first valve retaining nut 226.

The hot water supply tube 228 and the cold water supply tube 230 of the first valve body 222 are positioned through a first opening 252 of an escutcheon 254 and a first opening 256 of a deck plate assembly 258. A valve body screw 260 may be used to fasten the first valve body 222 to the escutcheon 254. A bearing washer 262 may be located between the first valve body 222 and the escutcheon 254.

The escutcheon 254 and deck plate assembly 258 are mounted on a support surface, for example, a sink deck (not shown). In this manner, the hot water supply tube 228 and the cold water supply tube 230 may pass through an opening in the sink deck for connection to a hot water supply source and a cold water supply source, respectively. The deck plate assembly 258 includes a deck plate 264 located below the escutcheon 254 and a deck seal (not shown) disposed between the deck plate 264 and an upper surface of the sink deck. A mounting/bracket assembly 266 is disposed below the sink deck to secure the faucet assembly 200 relative to the sink deck.

A dome 270 covers the first valve retaining nut 226 and connects (e.g., via threaded surfaces) to the first valve body 222. A stem 274 located on a top portion of the first valve 224 projects through a central opening of the first valve retaining nut 226 and a central opening of the dome 270 and into a lower portion of the handle 272. A handle set screw 276 is used to secure the handle 272 to the stem 274. Optionally, a plug button 278 may be used to conceal the handle set screw 276 for cosmetic reasons.

Accordingly, a user can manipulate the handle 272 to actuate the first valve 224. For example, lifting the handle increases the flow rate of the water delivered to the spout 204, while lowering the handle decreases the flow rate of the water delivered to the spout 204. Additionally, lateral movement of the handle adjusts the temperature of the water delivered to the spout 204 by varying the amount of hot water and cold water being mixed.

Figure 5:
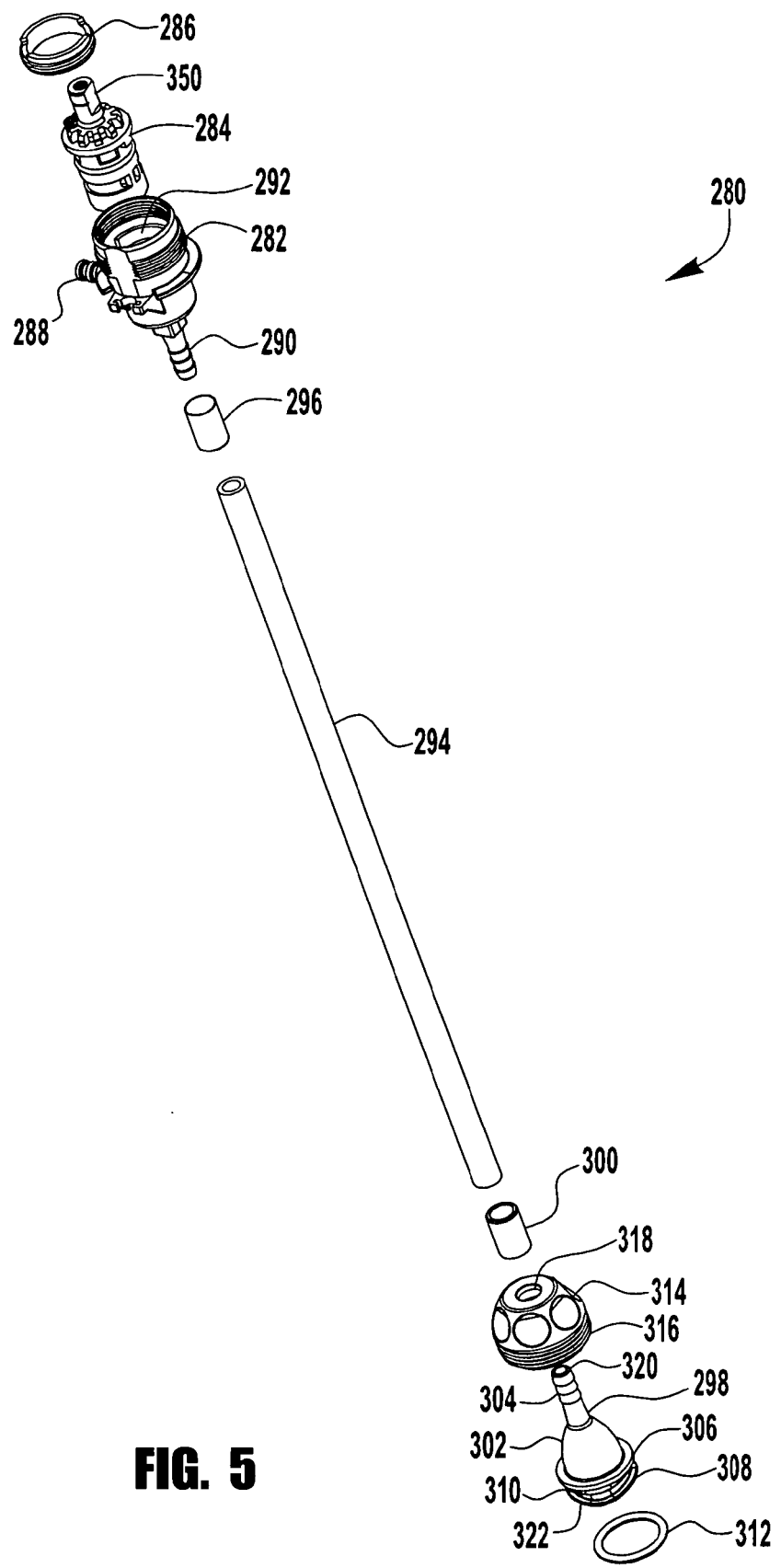
FIG. 5 is an exploded perspective view of a second valve assembly of FIG. 1.
Figure 6:
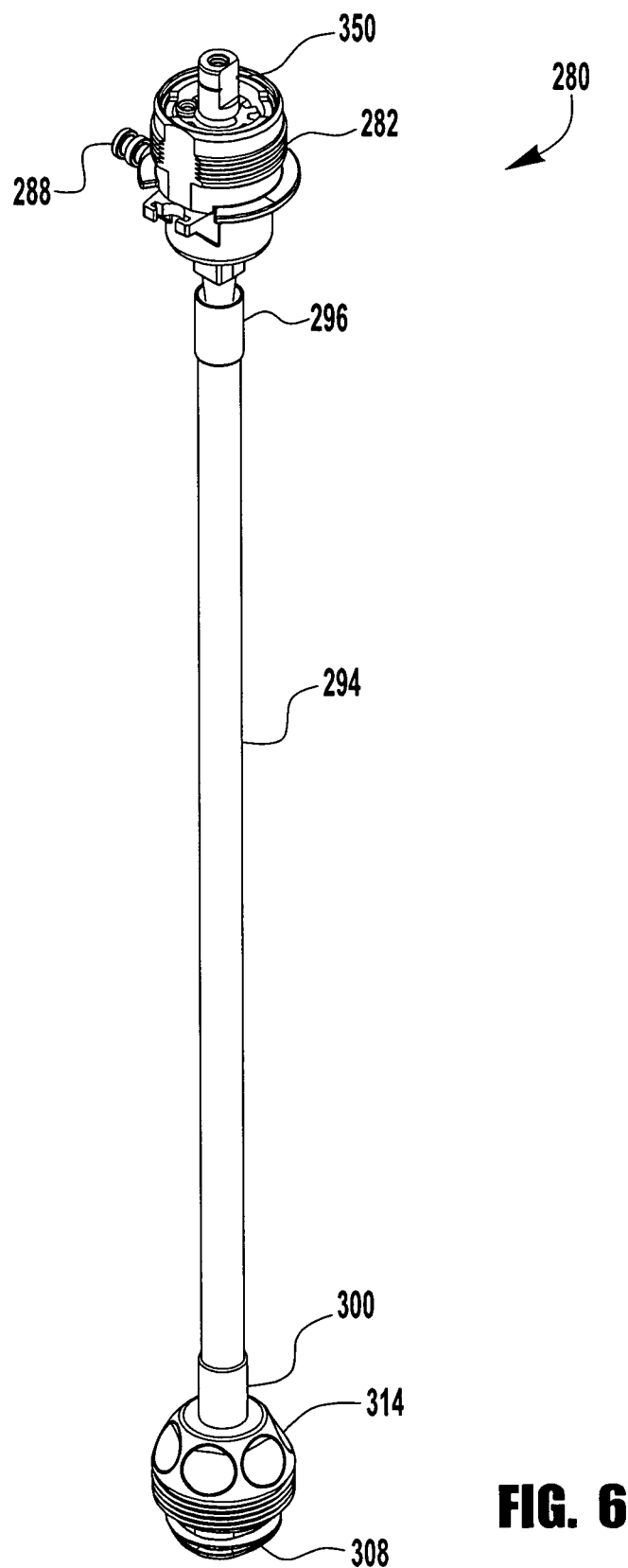
FIG. 6 is a perspective view of the second valve assembly of FIG. 5.

As shown in FIGS. 5 and 6, the second valve assembly 280 includes a second valve body 282, a second valve 284 and a second valve retaining nut 286. The second valve body 282 includes a water inlet barb 288 and a water outlet barb 290. The second valve 284 is disposed within a cavity 292 of the second valve body 282. The second valve 284 controls the amount of filtered water delivered from the filtration assembly 400 to the spout 204 for output at the filter tip 210. The second valve 284 may be a cartridge-type valve assembly.

The second valve assembly 280 further includes a tube 294 serving as a waterway between the filtration assembly 400 and the second valve 284. The tube 294 is connected at one end to the water inlet barb 290, for example, via a crimp sleeve 296. The other end of the tube 294 is connected to a dome barb 298, for example, via a crimp sleeve 300.

The dome barb 298 serves as a filtered water outlet of the filtration assembly 400. The dome barb 298 has a hollow dome portion 302 that narrows into a hollow tip portion 304. On an exterior surface of the dome portion 302, an upper lip 306 and a lower lip 308 form a groove 310 for receiving an O-ring 312. The O-ring 312 forms a seal between the dome barb 298 and an interior surface of a manifold body 404 of a filter manifold assembly 402 (see FIG. 7), as described below.

Furthermore, a dome barb retaining nut 314 secures the dome barb 298 to the filter manifold assembly 402. For example, a threaded portion 316 of the dome barb retaining nut 314 engages an upper threaded portion 436 of the manifold body 404 to secure the dome barb 298 to the manifold assembly 402. In this manner, the tip portion 304 of the dome barb 298 extends through an upper central opening 318 of the dome barb retaining nut 314, so that the tip portion 304 can be joined to the tube 294. The tip portion 304 of the dome barb 298 defines an outlet end 320 of the dome barb 298, while the dome portion 302 of the dome barb 298 defines an inlet end 322 of the dome barb 298.

Another tube 324 (see FIG. 1) is used to establish a waterway between the second valve 224 and the filter tube 214 in the spout 204. O-rings 326 and 328 may be used to form a seal at the joint where the water outlet barb 288 of the second valve assembly 280 and the tube 324 are joined. O-rings 330 and 332 may be used to form a seal at the joint where the tube 324 and the spout assembly 202 are joined.

The second valve body 282 containing the second valve 284 extends through a second opening 334 in the escutcheon 254. A spacer 336 may be used, for example, to accommodate the second valve retaining nut 286. Preferably, but not necessarily, the spacer 336 includes a spacer opening 340 for accommodating a light-emitting diode (LED) 342 of an LED assembly 344. In this manner, the spacer 336 provides a rigid stop for the second valve retaining nut 286, so that the second valve retaining nut 286 is not tightened against the LED 342.

The LED assembly 344 includes the light-emitting diode 342 and a first wiring 346. Preferably, but not necessarily, the first wiring 346 has a first connector 348 at one end to facilitate connection to another wiring. The light-emitting diode 342 may be used to indicate that a filter assembly 526 (see FIG. 12) should be replaced because, for example, its filtering capacity is spent.

A stem 350 located on a top portion of the second valve 284 projects through a central opening of the second valve retaining nut 286 and a central opening of the spacer 340 and into a lower portion of the handle 338. A handle screw 352 is used to secure the handle 338 to the stem 350. Optionally, a handle cap 354 may be used to conceal the handle screw 352 for cosmetic reasons.

Accordingly, a user can manipulate the handle 338 to actuate the second valve 284. For example, turning the handle clockwise increases the flow rate of the filtered water delivered to the spout 204, while turning the handle counterclockwise decreases the flow rate of the filtered water delivered to the spout 204. In another exemplary embodiment, an actuator (e.g., a button) is provided in lieu of the handle 338 to control delivery of the filtered water to the spout 204, wherein the flow rate of the filtered water may be fixed.

As described above, the faucet assembly 200 allows a user to control delivery of unfiltered water from a water supply source and filtered water from a filtration assembly 400 to a single spout assembly 202. The filtration assembly 400 shown in FIGS. 1-3 will now be described in more detail with reference to FIGS. 7-14.

The filtration assembly 400 includes a filter manifold assembly 402, a filter bracket or mounting assembly 474 and a filter assembly 526.

Figure 7:
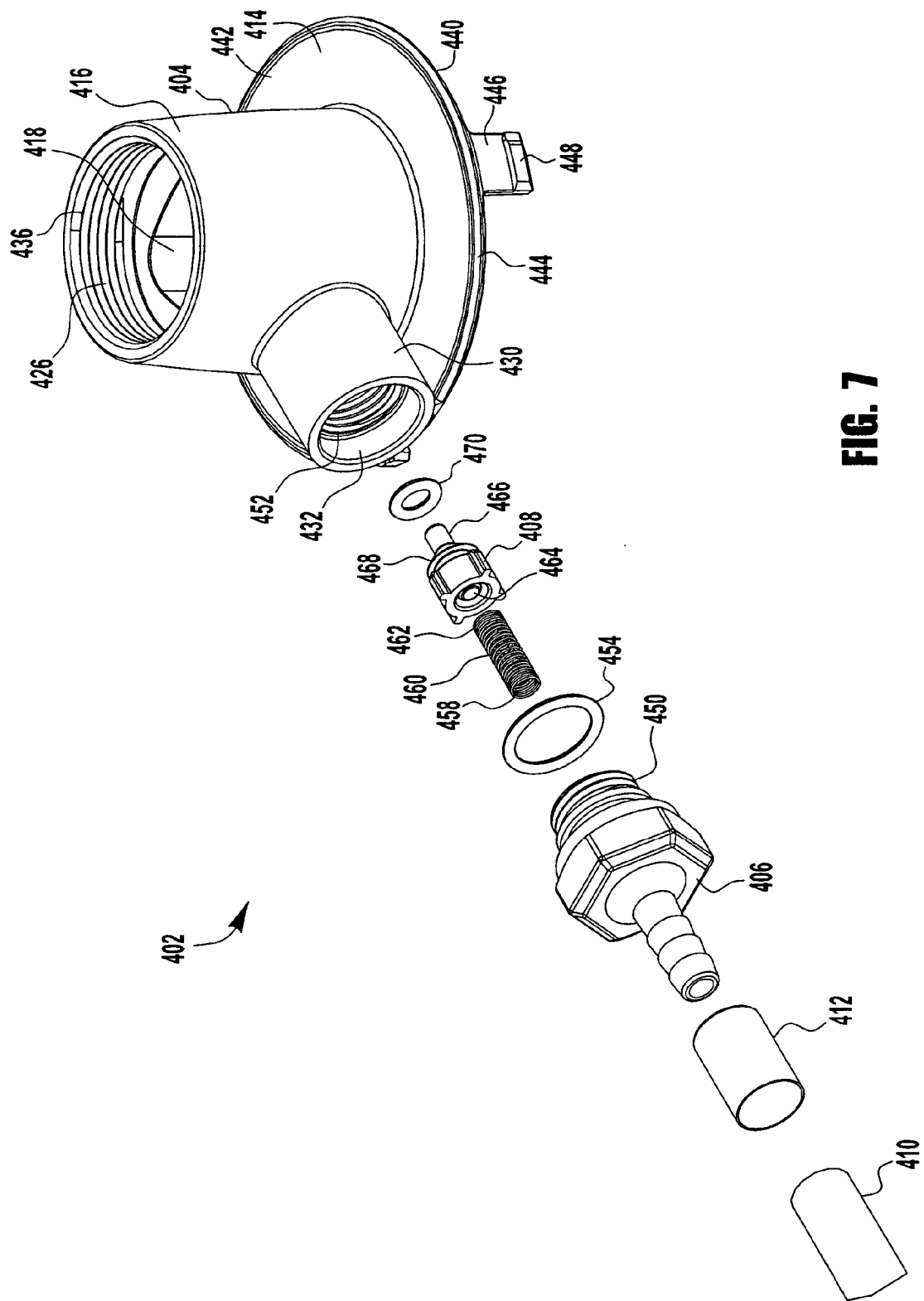
FIG. 7 is an exploded perspective view of a filter manifold assembly of FIG. 1.
Figure 8:
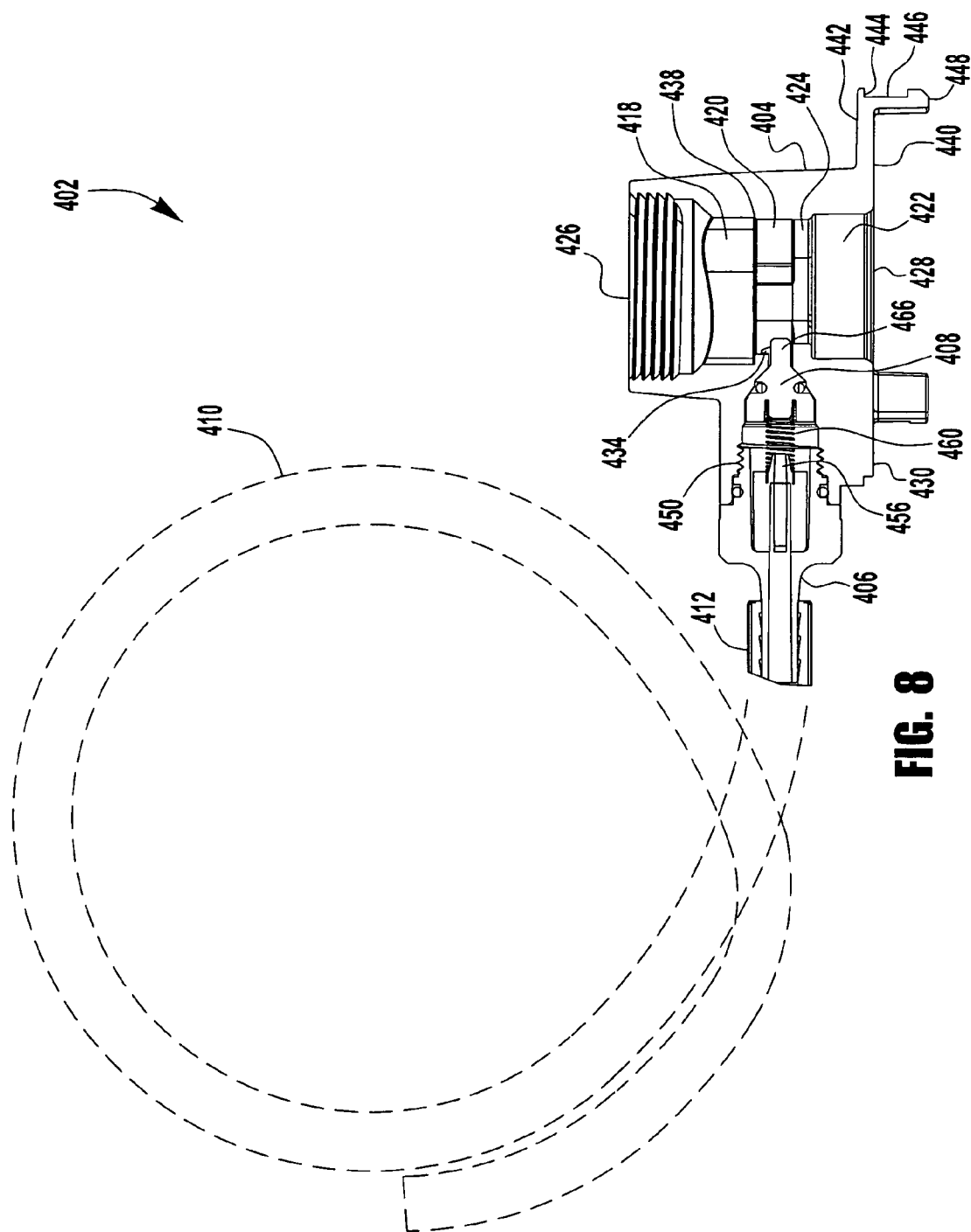
FIG. 8 is a cross-sectional view of the filter manifold assembly along line B-B of FIG. 3.

The filter manifold assembly 402 is shown as an exploded view in FIG. 7 and as a cross-sectional view in FIG. 8. The filter manifold assembly 402 includes a manifold body 404, a water inlet barb 406 and a plunger 408. The filter manifold assembly 402 facilitates connection of a water supply source (not shown), the filter assembly 526 and the second valve assembly 280. The water supply source may be a separate water supply source or may be the aforementioned cold water supply source.

Unfiltered water is delivered from the water supply source to the water inlet barb 406 of the filter manifold assembly 402 via a tube 410. The tube 410 may be connected to the water inlet barb 406 by a crimp sleeve 412.

The manifold body 404 includes a flat base 414 with a cylindrical portion 416 formed thereon. The cylindrical portion 416 is hollow and has a cavity that forms at least a first inner portion 418, a second inner portion 420 and a third inner portion 422. A lower ledge 424 separates the second inner portion 420 and the third inner portion 422. An upper opening 426 is formed in the cylindrical portion 416 and a lower opening 428 is formed in the flat base 414. A tubular projection 430 extends from the cylindrical portion 416. The tubular projection 430 forms an outer side opening 432 and an inner side opening 434. The inner side opening 434 is formed where the tubular projection 430 and the cylindrical portion 416 meet and forms a waterway from the water inlet barb 406 to the second inner portion 420 of the cylindrical portion 416 of the manifold body 404.

The upper opening 426 is for mounting the dome barb 298 to the filter manifold assembly 402. The lower opening 428 is for inserting the filter assembly 526 therein, as described below. The outer side opening 432 and the inner side opening 434 are for mounting the water inlet barb 406 and the plunger 408 therein, so as to control the flow of unfiltered water from the water supply source to the filtration assembly 400.

The upper threaded portion 436 of the cylindrical portion 416 of the manifold body 404 engages with the threaded portion 316 of the dome barb retaining nut 314 to secure the dome barb 298 within the cylindrical portion 416 of the manifold body 404. In particular, the lower lip 308 of the dome barb 298 rests on an upper ledge 438 between the first inner portion 418 and the second inner portion 420, such that the O-ring 312 located in the groove 310 of the dome barb 298 is housed within the first inner portion 418 of the manifold body 404. The dome barb retaining nut 314 prevents the O-ring 312 from exiting the first inner portion 418, thereby maintaining the seal formed by the O-ring 312. Preferably, but not necessarily, the lower lip 308 of the dome barb 298 has a non-circular shape for fitting into the first inner portion 418 having the same non-circular shape. For example, a multi-lobular shape and, in particular, a tri-lobular shape, may be used as the non-circular shape.

The flat base 414 of the manifold body 404 is substantially circular. The circumference of a lower portion 440 of the flat base 414 is less than the circumference of an upper portion 442 of the flat base 414, so as to form a recessed lip 444 around the outer edge of the flat base 414. A plurality of flanges 446 are disposed on the outer edge of the lower portion 440 of the flat base 414. Each flange 446 has a tooth 448 thereon. The flanges 446 and teeth 448 are used to connect the filter manifold assembly 402 to the filter bracket assembly 474, as described below.

The water inlet barb 406 has a threaded portion 450 for engaging a threaded portion 452 of the tubular projection 430 of the manifold body 404. Preferably, but not necessarily, adhesive is applied to the threaded portion 450 of the water inlet barb 406 before it engages the threaded portion 452 of the tubular projection 430. Additionally, an O-ring 454 is positioned on the water inlet barb 406 and adjacent to the threaded portion 450 of the water inlet barb 406 to form a seal where the water inlet barb 406 and the tubular projection 430 are joined.

A projection 456 is disposed in an interior cavity of the water inlet barb 406 for engaging one end 458 of a plunger spring 460. The other end 462 of the plunger spring 460 is inserted into a recessed end 464 of the plunger 408. In this manner, the plunger spring 460 urges the plunger 408 toward the second inner portion 420 of the cylindrical portion 416 of the manifold body 404.

More particularly, the plunger spring 460 urges the plunger 408 into a "closed" position by urging the plunger 408 toward the inner side opening 434 of the tubular projection 430, such that a plunger tip 466 protrudes through the inner side opening 434 and a smooth end 468 of the plunger 408 blocks the inner side opening 434. In this "closed" position, water flowing into the water inlet barb 406 and the tubular projection 430 cannot enter the cylindrical portion 416 of the manifold body 404. Additionally, an O-ring 470 may be positioned in a groove 472 adjacent to the smooth end 468 of the plunger 408 to ensure a water-tight seal between the plunger 408 and the inner side opening 434. The plunger 408 is configured to remain in the "closed" position when a filter is not present in the water filtration system 100 and to move to an "open" position when a properly configured filter is inserted in the water filtration system 100, as described below.

Figure 9:
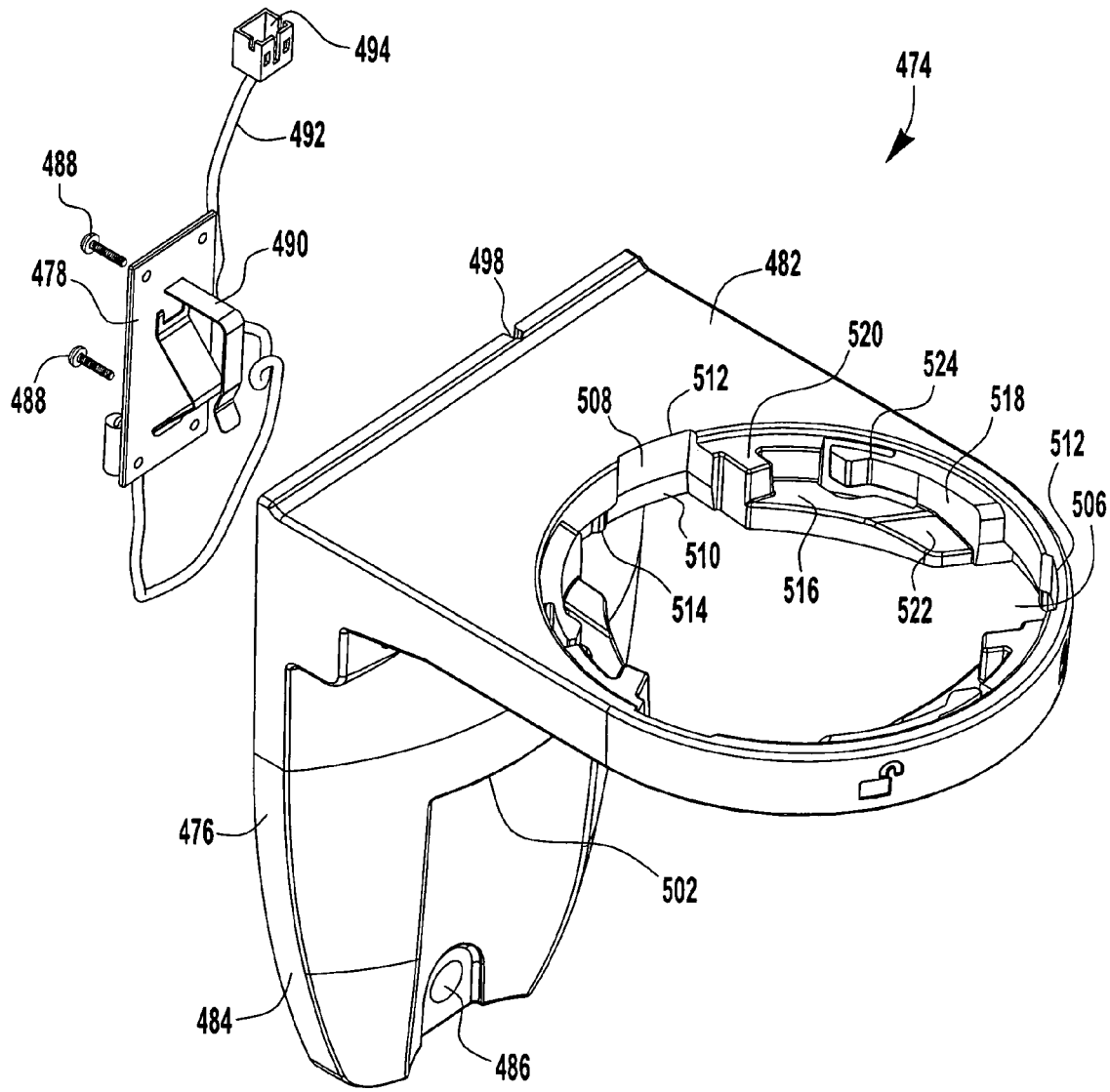
FIG. 9 is an exploded perspective view of a filter bracket assembly of FIG. 1.
Figure 9:
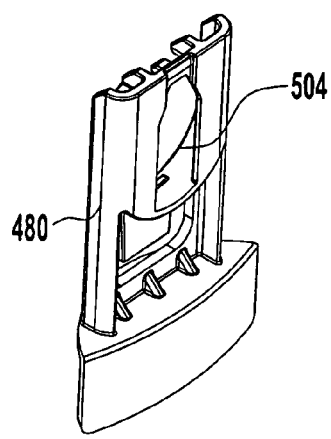
Figure 10:
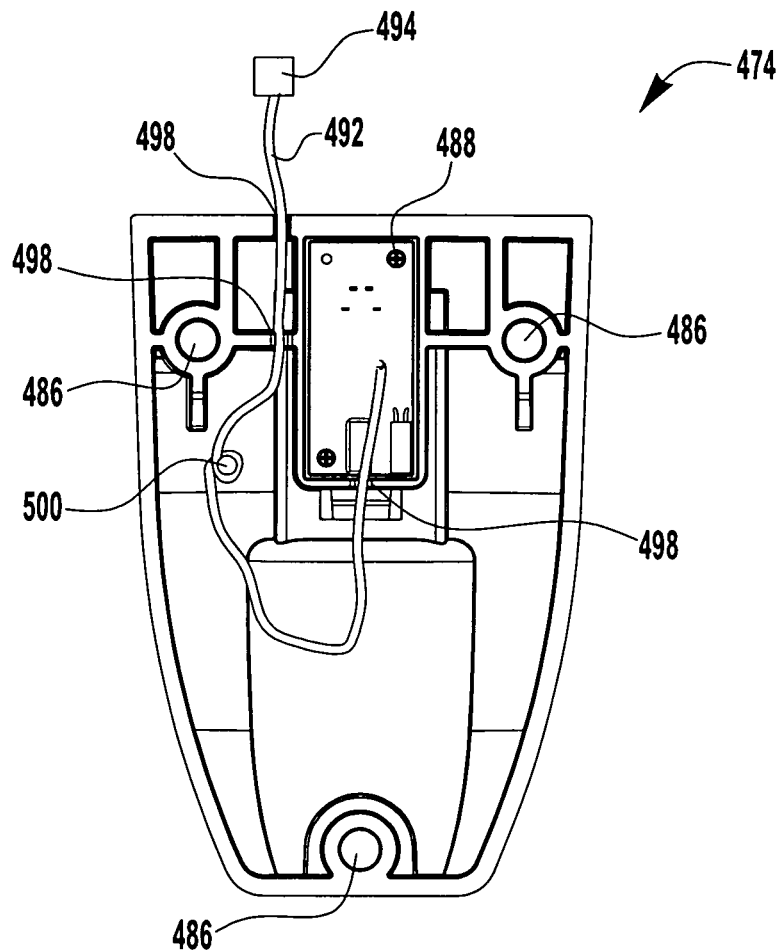
FIG. 10 is a rear view of the filter bracket assembly of FIG. 9.
Figure 11:
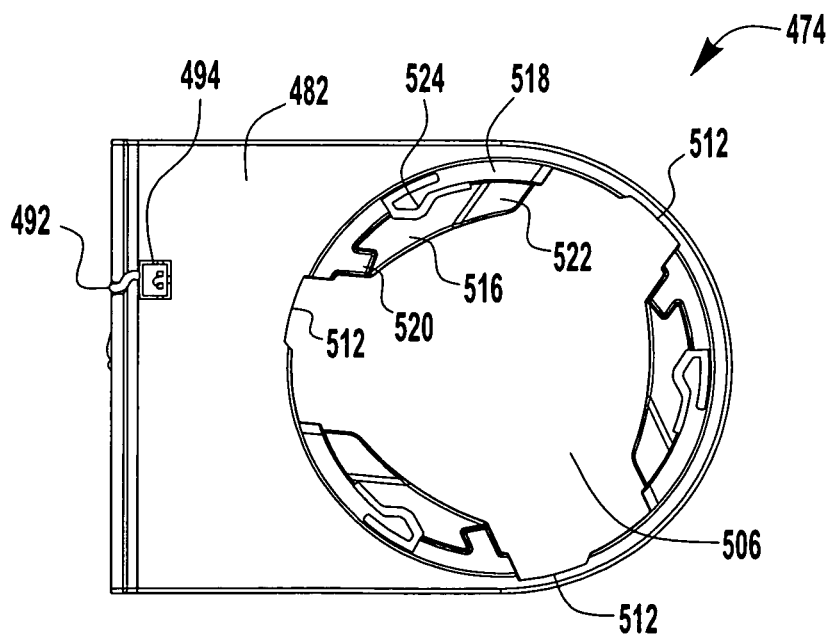
FIG. 11 is a top plan view of the filter bracket assembly of FIG. 9.

The filter bracket assembly 474 is shown as an exploded view in FIG. 9, a rear view in FIG. 10 and a top plan view in FIG. 11.

The filter bracket assembly 474 includes a bracket body 476, a printed circuit board (PCB) 478 and a sliding door 480. The filter bracket assembly 474 provides a support for the filter assembly 526 and the filter manifold assembly 402. In this manner, the filter bracket assembly 474 bears the weight of the filter assembly 526 and the filter manifold assembly 402.

The bracket body 476 includes an upper portion 482 and a lower portion 484. Preferably, but not necessarily, the upper portion 482 is perpendicular to the lower portion 484. The lower portion 484 has a plurality of mounting holes 486 for mounting the bracket body 476 to a support surface or structure (e.g., a cabinet wall).

A rear surface of the lower portion 484 includes an area for mounting the PCB 478 thereon. For example, a plurality of screws 488 are used to fasten the PCB 478 to the bracket body 476. The PCB 478 includes metal contacts 490 and a second wiring 492. Preferably, but not necessarily, the second wiring 492 has a second connector 494 at one end to facilitate connection to the first connector 348 of the first wiring 346.

The metal contacts 490 make contact with a battery 496, which acts as a power source for the PCB 478 and the LED assembly 344. The second wiring 492 connects to the first wiring 346 such that if the PCB 478 determines (e.g., based on elapsed time, gallons filtered, etc.) that the filter assembly 526 needs to be replaced, the PCB 478 causes an electric current to flow to and illuminate the LED 342. In this manner, a user is provided with a visual reminder to replace the filter assembly 526.

The rear surface of the lower portion 484 also includes a plurality of wiring recesses 498 for holding and guiding the second wiring 492. Additionally, a wiring post 500 is provided to anchor the second wiring 492 so that a force (e.g., caused by inadvertent contact) on the second wiring 492 is distributed to the wiring post 500 and not only to the point where the second wiring 492 and the PCB 478 are joined.

A front surface of the lower portion 484 includes a door slot 502 for receiving the sliding door 480. The sliding door 480 includes a battery compartment 504 for holding the battery 496. Preferably, but not necessarily, the battery 496 is initially attached (e.g., via adhesive) to the filter assembly 526 (see FIGS. 1, 2, 12 and 13) so that a user can install/replace the battery 496 at the time of installing/replacing the filter assembly 526. In particular, the user removes the battery 496 from the filter assembly 526 and inserts the battery 496 into the battery compartment 504 of the sliding door 480. Alternatively, the battery 496 may be integrated into the filter assembly 526 so that replacing the filter assembly 526 necessarily includes replacing the battery 496 without requiring additional effort on the part of the user.

Preferably, but not necessarily, the sliding door 480 may be readily inserted into and removed from the door slot 502 by a user without using any tools. For example, the sliding door 480 may friction fit into the door slot 502 such that the sliding door 480 remains seated in the door slot 502 until the user pulls it out. Fully inserting the sliding door 480 into the door slot 502 causes the metal contacts 490 to contact the battery 496.

The upper portion 482 of the bracket body 476 includes an opening 506. The opening 506 includes an upper wall 508 and a lower wall 510 defining the circumference of the opening 506. A circumference of the upper wall 508 is generally greater than the circumference of the recessed lip 444 of the flat base 414 of the manifold body 404 but less than the circumference of the upper portion 442 of the flat base 414 of the manifold body 404.

A plurality of notches 512 are formed along the upper wall 508 of the opening 506. The thickness of the upper wall 508 decreases in the notches 512. Adjacent to the notches 512, the upper wall 508 extends out over the lower wall 510. A rib 514 is formed near a point where the notch 512 abuts the upper wall 508. Preferably, but not necessarily, the point where the notch 512 abuts the upper wall 508 is sloped.

A plurality of ledges 516 project within the opening 506. Preferably, but not necessarily, the ledges 516 are evenly spaced within the opening 506, that is every 120 degrees. Preferably, but not necessarily, the thickness of the ledges 516 is approximately equal to the height of the lower wall 510.

Each ledge 516 includes a raised side wall 518, a raised stop 520 and a sloped portion 522. The raised side wall 518 is thicker than the ledge 516 but does not protrude into the opening 506 as far as the ledge 516. The raised stop 520 is the same thickness as the raised side wall 518 but protrudes into the opening 506 further than the raised side wall 518. The raised stop 520 is located at one end of the ledge 516 and the sloped portion 522 is located on the opposite end of the ledge 516. A flange 524 is positioned approximately in the middle of the raised side wall 518. The flange 524 is operable to move away from a center of the opening 506 toward the upper wall 508 if sufficient force is applied to the flange 524. The ledges 516 allow the filter assembly 526 to interface with (and lock into) the filter bracket assembly 474, as described below.

Figure 12:
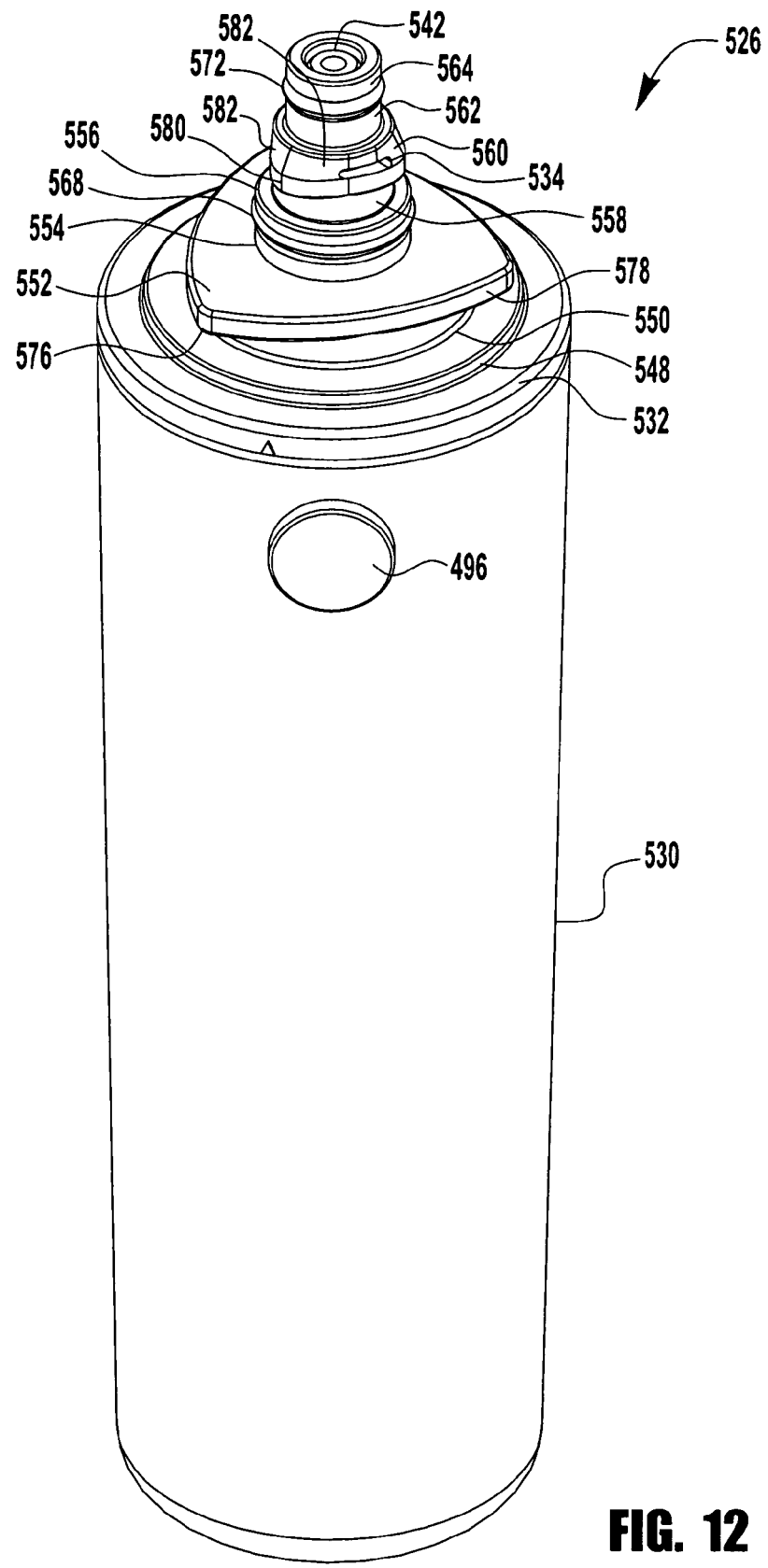
FIG. 12 is a perspective view of a filter assembly of FIG. 1.
Figure 13:
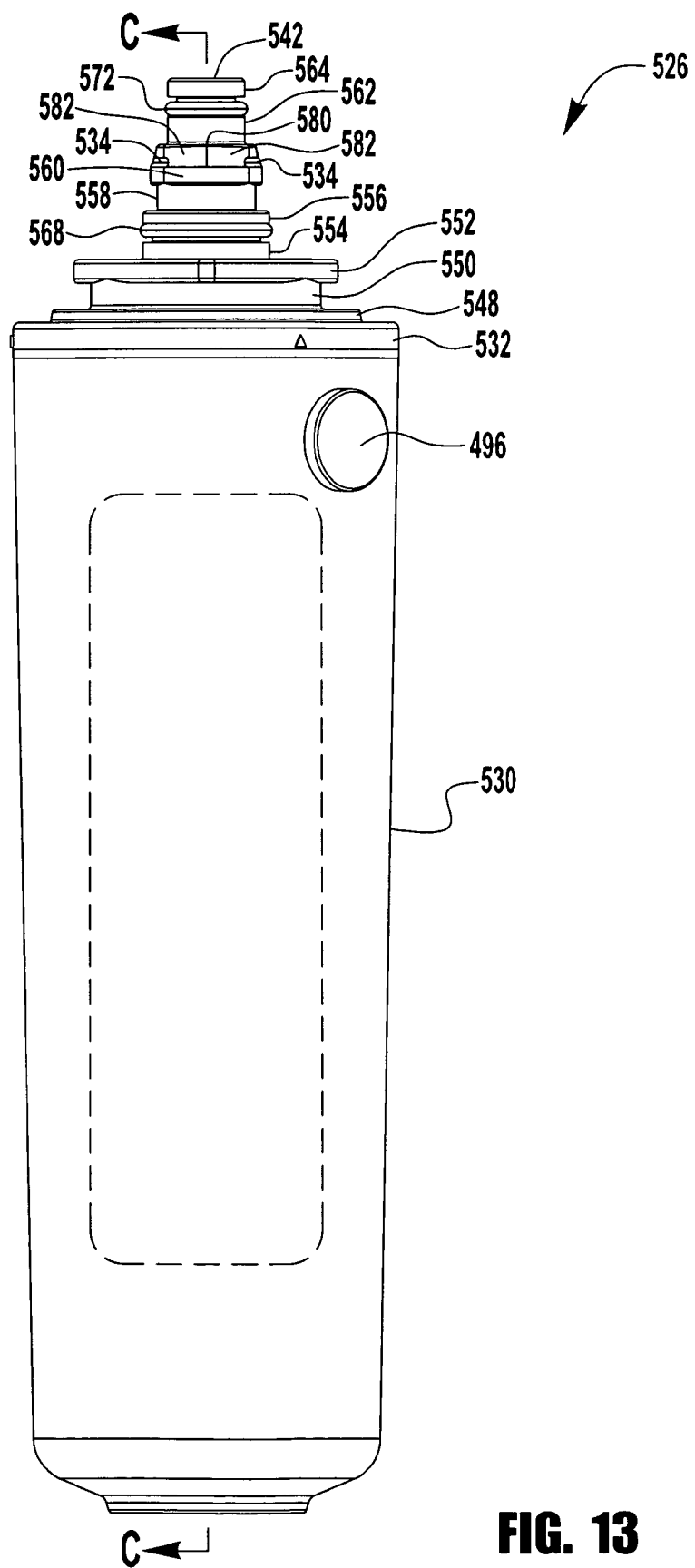
FIG. 13 is a side view of the filter assembly of FIG. 12.
Figure 14:
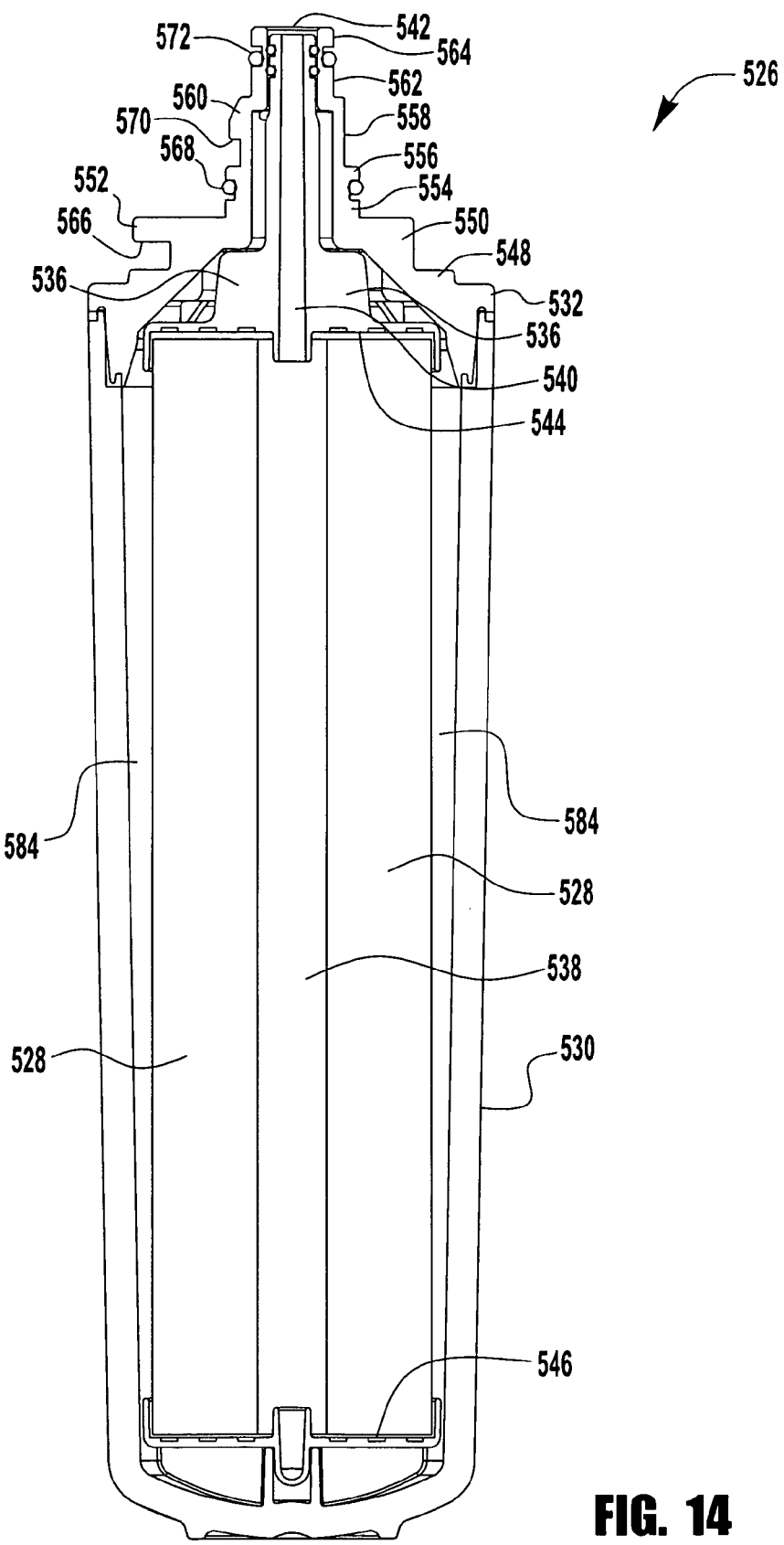
FIG. 14 is a cross-sectional view of the filter assembly along line C-C in FIG. 13.

A perspective view of the filter assembly 526 is shown in FIG. 12, a side view of the filter assembly 526 is shown in FIG. 13 and a cross-sectional view of the filter assembly 526 is illustrated in FIG. 14.

Preferably, but not necessarily, the filter assembly 526 uses a carbon filter and, in particular, an activated charcoal filter. Activated charcoal is charcoal that has been treated with oxygen to open up a multitude of tiny pores between the carbon atoms. The use of special manufacturing techniques results in highly porous charcoals that have very large surface areas. The huge surface area of activated charcoal gives it numerous bonding sites. When certain chemicals pass next to the carbon surface, they attach to the surface and are trapped. Once all of the bonding sites are filled, an activated charcoal filter stops working and should be replaced.

The filter assembly 526 may be configured to operate across a predetermined range of water pressures. Preferably, but not necessarily, the filter assembly 526 operates within a water pressure range of 20 to 125 pounds per square inch (psi). The filter assembly 526 may be configured to operate across a predetermined range of water temperatures. Preferably, but not necessarily, the filter assembly 526 operates within a water temperature range of 35 to 100° F. The filter assembly 526 may be configured to have a predetermined usage duration, after which the filter assembly 526 should be replaced. In one exemplary embodiment, the filter assembly 526 has a usage duration of six months.

The filter assembly 526 includes a tubular filter cartridge 528 disposed in a tubular filter canister 530 sealed with a canister cap 532. Unfiltered water enters the filter canister 530 via inlet ports 534 and passes through an inlet waterway 536. Once inside the filter canister 530, the unfiltered water fills a space 584 surrounding the filter cartridge 528, passes through the filter cartridge 528 (with various chemicals and impurities being removed) and flows radially inward to a central cavity 538 of the filter cartridge 528. Accordingly, water in the central cavity 538 of the filter cartridge 528, which is now filtered water, may be discharged out of the filter canister 530 through an outlet waterway 540 and out an outlet port 542.

The filter cartridge 528 includes a filter cap 544, a filter bottom 546 and the central cavity 538. The outlet waterway 540 allows filtered water within the central cavity 538 to flow through the filter cap 544 and out the outlet port 542 disposed in an upper portion of the canister cap 532.

The canister cap 532 includes a first raised portion 548, a second raised portion 550, a lower connector 552, a lower lip 554, an upper lip 556, a lower shaft portion 558, an upper connector 560, a middle shaft portion 562 and an upper shaft portion 564. The canister cap 532 is hollow such that the outlet waterway 540 runs through a central opening therein and ends at the outlet port 542 formed in the upper shaft portion 564 of the canister cap 532.

Preferably, but not necessarily, the first raised portion 548 and the second raised portion 550 are circular. Preferably, but not necessarily, the circumference of the first raised portion 548 is greater than the circumference of the second raised portion 550. Preferably, but not necessarily, the height of the first raised portion 548 is less than the height of the second raised portion 550.

The lower connector 552 of the canister cap 532 is formed on the second raised portion 550. The lower connector 552 has a non-circular shape. Preferably, but not necessarily, the lower connector 552 has a multi-lobular shape (e.g., the tri-lobular shape illustrated in FIG. 12). Portions of the lower connector 552 extend over the second raised portion 550 to form overhanging portions 566 (see FIG. 14).

The lower lip 554 and the upper lip 556 of the canister cap 532 are formed above the lower connector 552. Preferably, but not necessarily, the lower lip 554 and the upper lip 556 are circular. Preferably, but not necessarily, the lower lip 554 and the upper lip 556 have the same circumference. A groove is defined between the lower lip 554 and the upper lip 556 for receiving an O-ring 568. The O-ring 568 forms a seal between the filter assembly 526 and the filter manifold assembly 402 when the filter assembly 526 is mounted in the water filtration system 100, as described below.

The lower shaft portion 558 is formed above the upper lip 556. Preferably, but not necessarily, the lower shaft portion 558 is circular. Preferably, but not necessarily, the circumference of the lower shaft portion 558 is less than the circumference of the upper lip 556.

The upper connector 560 of the canister cap 532 is formed on the lower shaft portion 558. The upper connector 560 has a non-circular shape. Preferably, but not necessarily, the upper connector 560 has a multi-lobular shape (e.g., the tri-lobular shape illustrated in FIG. 12). In one exemplary embodiment, the upper connector 560 has a non-circular shape formed from a circular portion and a projection extending from said circular portion that allows the unfiltered water to flow into the tubular filter canister 530. Portions of the upper connector 560 extend over the lower shaft portion 558 to form overhanging portions 570 (see FIG. 14).

The middle shaft portion 562 and the upper shaft portion 564 are formed above the upper connector 560. The upper shaft portion 564 includes the outlet port 542 for outputting filtered water from the filter assembly 526. Preferably, but not necessarily, the middle shaft portion 562 and the upper shaft portion 564 are circular. Preferably, but not necessarily, the circumference of the middle shaft portion 562 is less than the circumference of the lower shaft portion 558. Preferably, but not necessarily, the circumference of the upper shaft portion 564 is less than the circumference of the lower shaft portion 558. Preferably, but not necessarily, the middle shaft portion 562 and the upper shaft portion 564 have the same circumference. A groove is defined between the middle shaft portion 562 and the upper shaft portion 564 for receiving an O-ring 572. The O-ring 572 forms a seal between the filter assembly 526 and the dome barb 298 (in the filter manifold assembly 402) when the filter assembly 526 is mounted in the water filtration system 100, as described below.

The inlet ports 534 of the filter assembly 526 are disposed between the O-ring 568 and the O-ring 572 such that the O-rings 568, 572 are operable to form seals on both sides of the inlet ports 534. Preferably, but not necessarily, the distance from a centerline of the O-ring 568 to a centerline of the O-ring 572 is between 0.670 inches and 1.315 inches, inclusive. In one exemplary embodiment, the distance from the centerline of the O-ring 568 to the centerline of the O-ring 572 is 0.995 inches±0.005 inches. Preferably, but not necessarily, the O-ring 568 has an outer diameter of between 0.981 inches and 1.060 inches, inclusive. In one exemplary embodiment, the O-ring 568 has an (uncompressed) thickness of approximately 0.103 inches and an outer diameter of approximately 1.031 inches. Preferably, but not necessarily, the O-ring 572 has an outer diameter of between 0.603 inches and 0.680 inches, inclusive. In one exemplary embodiment, the O-ring 572 has an (uncompressed) thickness of approximately 0.103 inches and an outer diameter of approximately 0.651 inches.

In another exemplary embodiment, the filter assembly 526 includes structure for protecting an internal filter (i.e., filter cartridge 528) of the filter assembly 526. For example, a mesh sleeve (not shown) may be wrapped around the filter cartridge 528 to strengthen the filter cartridge 528 and protect it from damage during assembly, transit, etc. Additionally, a plurality of ribs (not shown) may project from an inner surface of the filter canister 530 and surround the filter cartridge 528 (with or without the mesh sleeve) to limit or prohibit radial movement of the filter cartridge 528 within the filter canister 530, thereby further protecting the filter cartridge 528 from damage during assembly, transit, etc.

In further describing the exemplary embodiments, the filtration assembly 400 (e.g., including the filter assembly 526) connects to the faucet assembly 200. By way of example, if the faucet assembly 200 is installed on a sink deck (not shown), the filtration assembly 400 may be installed below the sink deck (e.g., in a cabinet). A label 586 may be affixed to an external surface of the filter canister 530 to provide printed information on installation instructions, operating conditions, etc.

Figure 15:
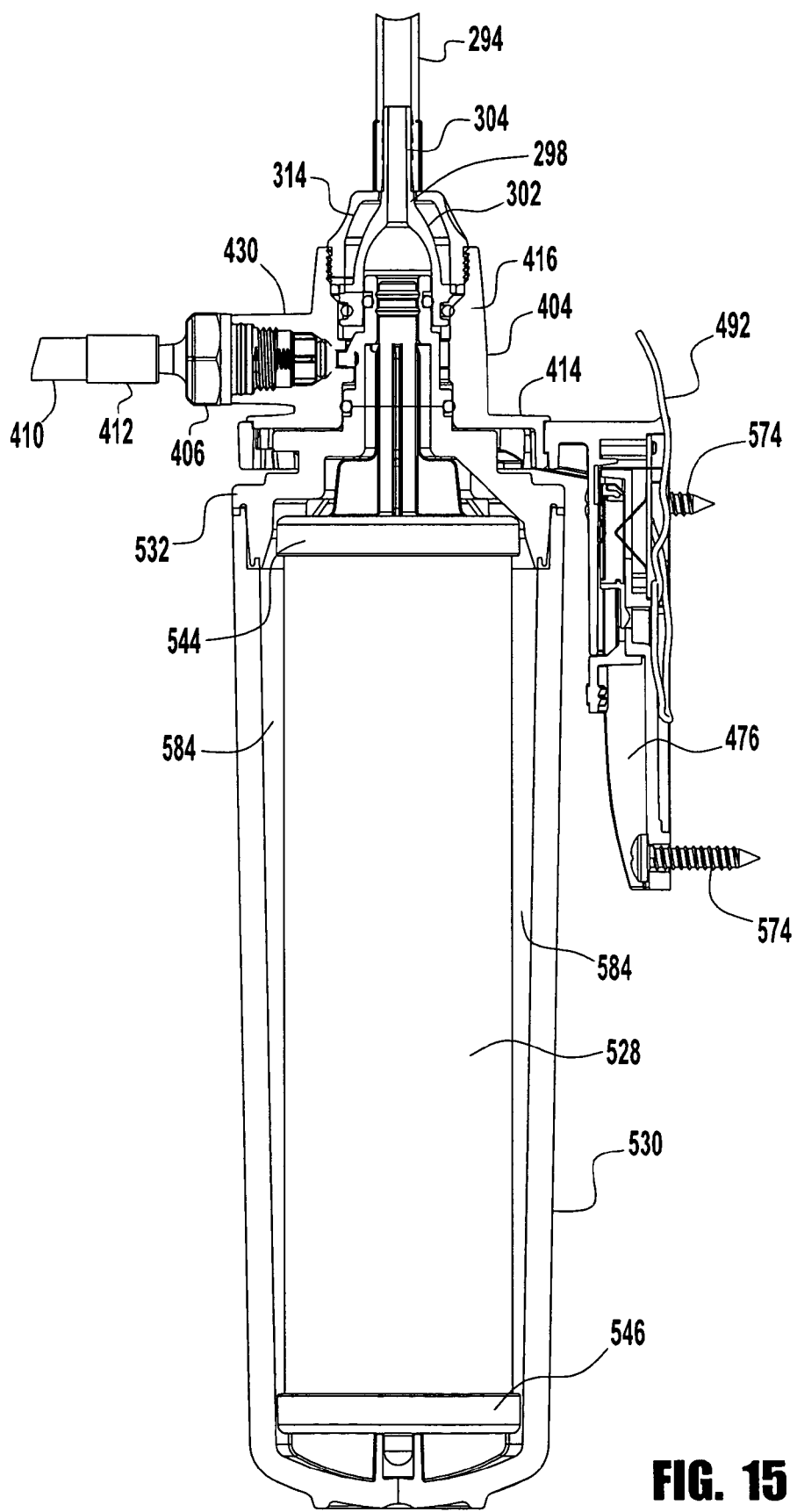
FIG. 15 is a cross-sectional view of a filtration assembly of FIG. 1.

FIG. 15 shows an assembled filtration assembly 400. In assembling the filtration assembly 400, the filter manifold assembly 402 is connected to the filter bracket assembly 474. In particular, each flange 446 on the flat base 414 of the manifold body 404 is aligned with a notch 512 in the upper wall 508 of the upper portion 482 of the bracket body 476, such that the manifold body 404 rests on the upper portion 482 of the bracket body 476 above the opening 506.

Then, by lowering the flanges 446 into the notches 512 and turning the manifold body 404 (e.g., counterclockwise) the teeth 448 of the flanges 446 ride over the ribs 514 on the lower wall 510 of the opening 506 to connect the manifold body 404 to the bracket body 476. The ledges 516 prevent the manifold body 404 from further counterclockwise rotation. Because the upper wall 508 projects into the opening 506 above the teeth 448, the manifold body 404 cannot be lifted from the bracket body 476 when the manifold body 404 and the bracket body 476 are so connected. Additionally, by virtue of the recessed lip 444, the flat base 414 of the manifold body 404 rests on the raised side walls 518 so that the filter bracket assembly 474 supports the filter manifold assembly 402.

Accordingly, the dome barb 298 of the second valve assembly 280 may be inserted into the upper opening 426 of the manifold body 404 and held therein by the dome barb retaining nut 314. In this manner, the water inlet barb 406 of the filter manifold assembly 402 functions as an unfiltered water inlet of the filtration assembly 400 and the dome barb 298 functions as a filtered water outlet of the filtration assembly 400. The tube 410 connects the water inlet barb 406 to a water supply source (not shown) and the tube 294 carries the filtered water output at the dome barb 298 to the second valve 284 of the faucet assembly 200.

Before or after connection of the filter manifold assembly 402 and the filter bracket assembly 474, the bracket body 476 is mounted to a support surface or structure (e.g., a wall of an under-the-sink cabinet). For example, mounting screws 574 (see FIG. 1) are inserted through the mounting holes 486 to secure the bracket body 476 to the support surface or structure.

Prior to mounting the filter bracket assembly 474, the PCB 478 is secured to the rear surface of the lower portion 484 of the bracket body 476 and the second wiring 492 is arranged with respect to the wiring post 500 and wiring recesses 498, as illustrated in FIG. 10.

The battery 496, which may initially be attached to an outer surface of the filter canister 530 (see FIGS. 1, 2, 12 and 13), is placed in the battery compartment 504 of the sliding door 480. The sliding door 480 is then inserted into the door slot 502 of the bracket body 476 so that the metal contacts 490 of the PCB 478 contact the battery 496. The second connector 494 of the second wiring 492 may be connected to the first connector 348 of the first wiring 346 so that the battery 496 powers and the PCB 478 controls the LED 342 of the LED assembly 344.

With the filter manifold assembly 402 connected to the filter bracket assembly 474, the water supply source and the faucet assembly 200 via the second valve 284, the filter assembly 526 can be installed. The shape and configuration of the canister cap 532 allows the filter assembly 526 to interface with the filter manifold assembly 402 and "lock" into the filter bracket assembly 474.

The second raised portion 550 of the canister cap 532 fits through the opening 506 including the ledges 516 of the upper portion 482 of the bracket body 476. The first raised portion 548 of the canister cap 532, however, does not fit through the opening 506 including the ledges 516. The lower connector 552 fits through the opening 506 including the ledges 516 of the bracket body 476 only if the filter canister 530 is properly oriented. For example, if the lower connector 552 has a tri-lobular shape as shown in FIG. 12, the lower connector 552 will fit through the opening 506 including the ledges 516 only when intersection points 576 where adjacent lobes 578 meet are oriented to pass through the spaces along the opening 506 between adjacent ledges 516.

Once the lower connector 552 is properly oriented, the filter canister 530 should be inserted into the bracket body 476 so that an upper surface of the first raised portion 548 of the canister cap 532 contacts the lower surface of the ledges 516 of the upper portion 482 of the bracket body 476. In this case, the lower connector 552 should be disposed in the opening 506 above the lower wall 510 such that no portion of the lower connector 552 overlaps any of the ledges 516.

The raised stops 520 of the ledges 516 contact the lobes 578 of the lower connector 552 to prevent the filter canister 530 from significantly rotating in a clockwise direction. Rotating the filter canister 530 in a counterclockwise direction causes a lower surface of the lower connector 552 to rotate along the ledges 516 so that the intersection points 576 of the lobes 578 depress the flanges 524 of the ledges 516 in order to rotate past the flanges 524.

Once the intersection points 576 have passed the flanges 524, the flanges 524 return to their original positions so as to resist clockwise rotation of the filter canister 530 within the opening 506 in the upper portion 482 of the bracket body 476. Additionally, the raised stops 520 of the ledges 516 contact the lobes 578 of the lower connector 552 to prevent further counterclockwise rotation of the filter canister 530. Accordingly, the filter canister 530 is considered to be installed and in a "locked" position relative to the filter bracket assembly 474.

To uninstall the filter assembly 526 from the filter bracket assembly 474, the filter canister 530 must be rotated in a clockwise direction with sufficient force to overcome the resistance of the flanges 524 against the intersection points 576 of the lobes 578.

As the filter assembly 526 is being installed in the filter bracket assembly 474, the filter assembly 526 is also interfacing with the filter manifold assembly 402 connected thereto (see FIG. 15). In particular, those portions of the canister cap 532 of the filter assembly 526 that are disposed above the lower connector 552 are inserted into the filter manifold assembly 402 (including the dome barb 298) as the filter assembly 526 is installed in the filter bracket assembly 474.

The lower ledge 424 between the second inner portion 420 and the third inner portion 422 located inside the cylindrical portion 416 of the manifold body 404 forms a non-circular (e.g., a multi-lobular and, in particular, a tri-lobular) opening between the second inner portion 420 and the third inner portion 422. Each of the upper shaft portion 564, the O-ring 572, the middle shaft portion 562, the upper connector 560 and the lower shaft portion 558 formed on the canister cap 532 are capable of fitting through the non-circular opening in the lower ledge 424. None of the upper lip 556, the O-ring 568 and the lower lip 554 are capable of fitting through the non-circular opening in the lower ledge 424.

For the upper connector 560 to fit through the non-circular opening in the lower ledge 424, the intersection points 580 where adjacent lobes 582 of the upper connector 560 meet must be oriented to correspond to the non-circular opening in the lower ledge 424. The intersection points 580 of the upper connector 560 are substantially aligned with the intersection points 576 of the lower connector 552. If the filter manifold assembly 402 is connected to the filter bracket assembly 474, as described above, then rotating the filter canister 530 so that the lower connector 552 will fit through the opening 506 and the ledges 516 in the upper portion 482 of the bracket body 476 of the filter bracket assembly 474 will ensure that the upper connector 560 is properly aligned to pass through the non-circular opening in the lower ledge 424 of the manifold body 404 of the filter manifold assembly 402. Otherwise, the upper connector 560 will not fit through the non-circular opening in the lower ledge 424.

Once the filter canister 530 is properly aligned and is lifted so that the lower connector 552 passes through the opening 506 and the ledges 516 in the upper portion 482 of the bracket body 476 of the filter bracket assembly 474, those portions of the canister cap 532 located above the upper lip 556 pass through the non-circular opening in the lower ledge 424. The upper lip 556, the lower lip 554 and the O-ring 568 disposed between the upper lip 556 and the lower lip 554 become located in the third inner portion 422 of the cylindrical portion 416 of the manifold body 404, directly below the lower ledge 424. In this manner, the upper lip 556, the lower lip 554 and the O-ring 568 form a seal between the filter assembly 526 and the filter manifold assembly 402 below the inlet ports 534 of the upper connector 560.

The upper shaft portion 564, the middle shaft portion 562 and the O-ring 572 disposed between the upper shaft portion 564 and the middle shaft portion 562 pass through an inlet end 322 of the dome barb 298 and become disposed inside a hollow dome portion 302 of the dome barb 298, which is held in the first inner portion 418 of the cylindrical portion 416 of the manifold body 404 by the dome barb retaining nut 314. In this manner, the upper shaft portion 564, the middle shaft portion 562 and the O-ring 572 form a seal between the filter assembly 526 and the filter manifold assembly 402 (housing the dome barb 298) above the inlet ports 534 of the upper connector 560.

As the filter canister 530 is installed, the upper connector 560 becomes located in the second inner portion 420 of the cylindrical portion 416 of the manifold body 404. Additionally, at least a portion of the lower shaft portion 558 of the canister cap 532 becomes aligned with the lower ledge 424 so that the filter canister 530 can be rotated with respect to the lower ledge 424 with the lower shaft portion 558 capable of rotating within the non-circular opening in the lower ledge 424.

Accordingly, when the lower connector 552 of the canister cap 532 is rotated counterclockwise to install the filter assembly 526 into the "locked" position relative to the filter bracket assembly 474, the upper connector 560 also rotates counterclockwise within the second inner portion 420 of the cylindrical portion 416 of the manifold body 404. Preferably, but not necessarily, a lower surface of the upper connector 560 rests on an upper surface of the lower ledge 424 after the filter canister 530 is rotated counterclockwise. Preferably, but not necessarily, a lower surface of the dome barb 298 at the inlet end 322 rests on an upper surface of the upper connector 560.

The upper connector 560 rotates counterclockwise within the second inner portion 420 of the cylindrical portion 416 of the manifold body 404 until the raised stops 520 of the ledges 516 of the bracket body 476 halt rotation of the lower connector 552. Accordingly, when the filter canister 530 has been installed into the "locked" position in the filter bracket assembly 474, one of the intersection points 580 of the lobes 582 of the upper connector 560 contacts the plunger tip 466 projecting through the inner side opening 434 of the tubular projection 430 of the manifold body 404.

By contacting the plunger tip 466, the upper connector 560 causes the plunger spring 460 to compress and the plunger 408 to move away from the inner side opening 434. Consequently, the smooth end 468 of the plunger 408 no longer blocks the inner side opening 434 of the tubular projection 430 of the manifold body 404. In this "open" position, water flowing in through the water inlet barb 406 and into the tubular projection 430 can enter the cylindrical portion 416 of the manifold body 404. In particular, unfiltered water from the water supply source can flow through the inner side opening 434 of the tubular projection 430 of the manifold body 404 and into the second inner portion 420 of the cylindrical portion 416 of the manifold body 404 where the upper connector 560 is located. The O-ring 568 forms a seal below the second inner portion 420 and the O-ring 572 forms a seal above the second inner portion 420 to prevent the unfiltered water from leaking out of the second inner portion 420.

The unfiltered water in the second inner portion 420 surrounds the upper connector 560 in the second inner portion 420 and enters the filter assembly 526 through the inlet ports 534 on the upper connector 560. The unfiltered water then flows through the inlet waterway 536 and into the space 584 surrounding the filter cartridge 528. The unfiltered water then passes through the filter cartridge 528 which causes various chemicals and impurities to be removed from the water. Accordingly, as the unfiltered water flows through the filter cartridge 528 it becomes filtered water. As the water is filtered, it flows into the central cavity 538 of the filter cartridge 528. The filtered water may be discharged from the central cavity 538 of the filter cartridge 528 through an outlet waterway 540 and out an outlet port 542 for delivery to the faucet assembly 200, for example, in response to a user manipulating the handle 338.

When the lower connector 552 of the canister cap 532 is rotated clockwise to uninstall the filter assembly 526 (e.g., to replace a spent filter assembly 526), the upper connector 560 rotates clockwise within the second inner portion 420 of the cylindrical portion 416 of the manifold body 404. Because of this clockwise rotation of the upper connector 560, none of the intersection points 580 of the lobes 582 of the upper connector 560 contact the plunger tip 466.

With no intersection points 580 contacting the plunger tip 466, the plunger spring 460 extends to urge the plunger tip 466 further through the inner side opening 434 of the tubular projection 430 of the manifold body 404 until the smooth end 468 of the plunger 408 blocks the inner side opening 434. As a result, when the filter canister 530 is moved into the "unlocked" position in the filter bracket assembly 474, unfiltered water is prevented from flowing into the cylindrical portion 416 of the manifold body 404. Accordingly, the flow of unfiltered water through the water filtration system 100 requires the presence of a properly configured filter assembly 526 and that the filter assembly 526 be properly installed.

In the water filtration system 100, according to the exemplary embodiments set forth above, separate valve assemblies allow a user to selectively obtain either filtered or unfiltered water at the same spout 204 of the faucet assembly 200. For example, filtered water may be selected for drinking or cooking, while unfiltered water may be selected for cleaning. Additionally, both filtered and unfiltered water may flow from the spout at the same time.

According to yet another exemplary embodiment, a filter adaptor is provided for adapting a different filter assembly for use in the water filtration system 100. The filter assembly to be adapted has at least one circular connector. The filter adaptor has at least one non-circular connector that is used instead of the circular connector when installing the filter assembly in the water filtration system 100.

Figure 16:
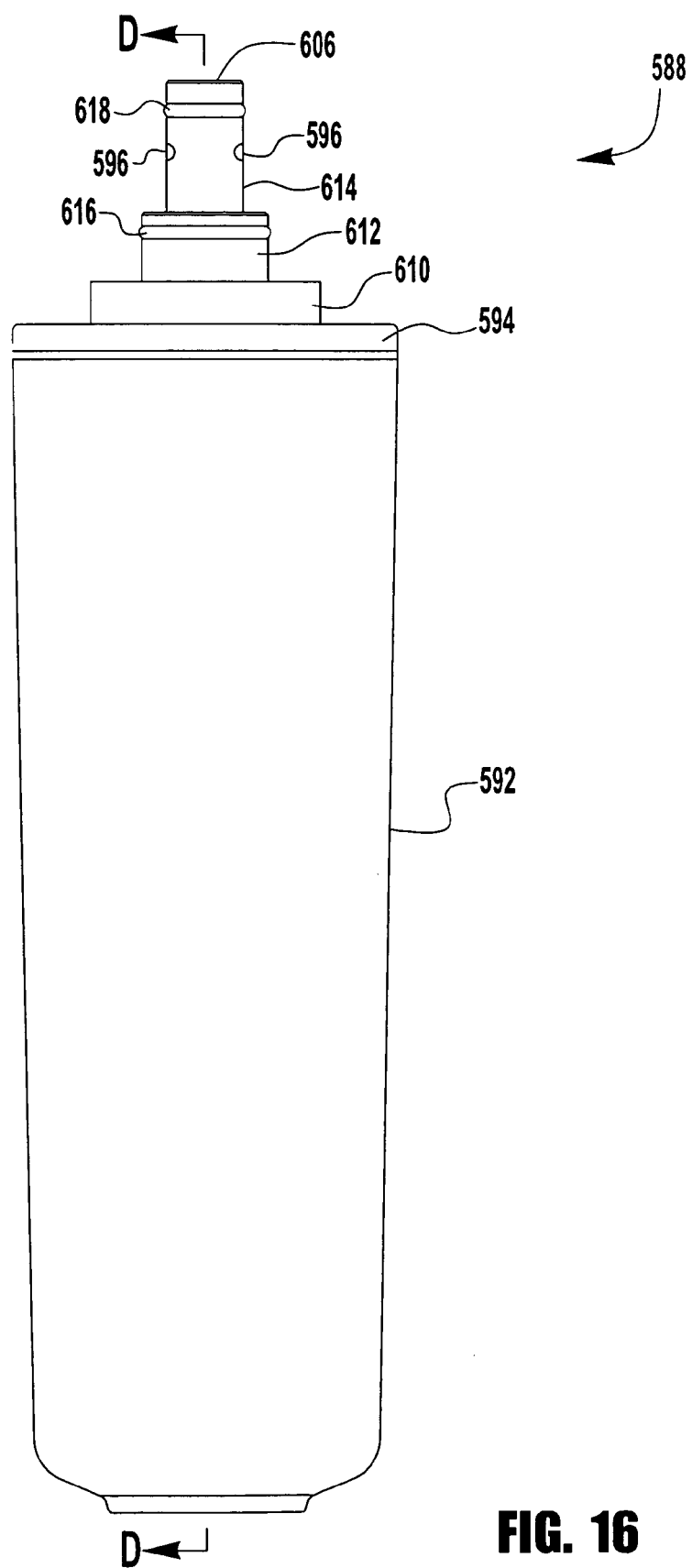
FIG. 16 is a side view of a filter assembly not configured to fit in the water filtration system of FIG. 1.
Figure 17:
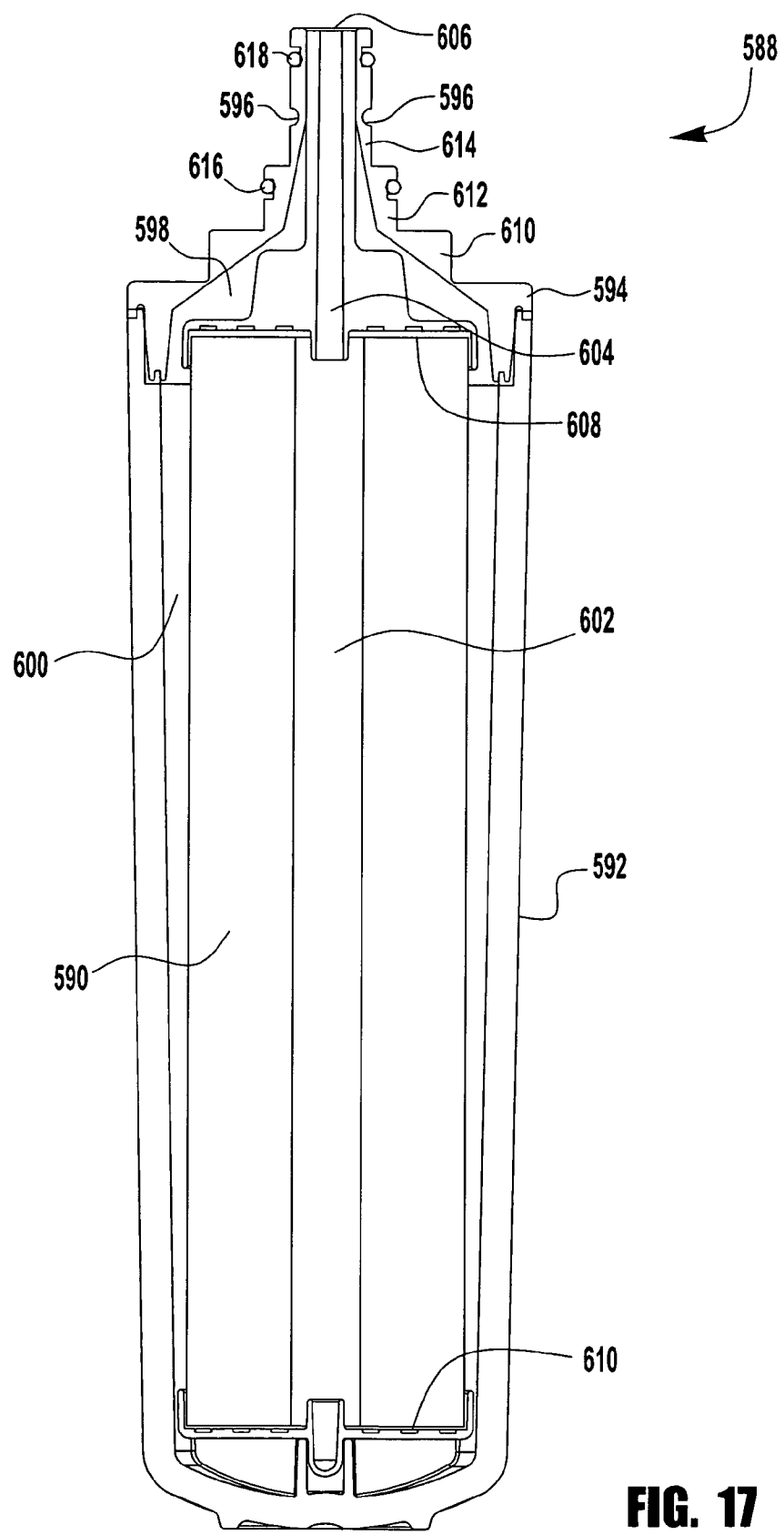
FIG. 17 is a cross-sectional view of the filter assembly along line D-D in FIG. 16.

As an example of the different filter assembly, a filter assembly 588 is shown in FIGS. 16 and 17. FIG. 16 is a side view of the filter assembly 588 and FIG. 17 is a cross-sectional view of the filter assembly 588. As configured, the filter assembly 588 is not suitable for use in the water filtration system 100. For example, the filter assembly 588 may not fit in the filter manifold assembly 402 and/or the filter bracket assembly 474, may fit poorly (i.e., leak) with respect the filter manifold assembly or may fit poorly (i.e., not be secured) with respect to the filter bracket assembly.

The filter assembly 588 includes a tubular filter cartridge 590 disposed in a tubular filter canister 592 sealed with a canister cap 594. The filter assembly 588 may use a carbon filter as described above. Unfiltered water enters the filter canister 592 via inlet ports 596 and passes through an inlet waterway 598. Once inside the filter canister 592, the unfiltered water fills a space 600 surrounding the filter cartridge 590, passes through the filter cartridge 590 (with various chemicals and impurities being removed) and flows radially inward to a central cavity 602 of the filter cartridge 590. Accordingly, water in the central cavity 602 of the filter cartridge 590, which is now filtered water, may be discharged out of the filter canister 592 through an outlet waterway 604 and out an outlet port 606.

The filter cartridge 590 includes a filter cap 608, a filter bottom 610 and the central cavity 602. The outlet waterway 604 allows filtered water within the central cavity 602 to flow through the filter cap 608 and out the outlet port 606 disposed in an upper portion of the canister cap 594.

The canister cap 594 includes a raised portion 610, a lower circular connector 612 and an upper circular connector 614. The canister cap 594 is hollow such that the outlet waterway 604 runs through a central opening therein such that the outlet port 606 extends to an opening in an upper portion of the canister cap 594.

The lower circular connector 612 of the canister cap 594 is formed on the raised portion 610. The upper circular connector 614 of the canister cap 594 is formed on the lower circular connector 612. Each of the lower circular connector 612 and the upper circular connector 614 has a substantially circular shape. The lower circular connector 612 includes a groove for receiving an O-ring 616. The upper circular connector 614 includes a groove for receiving an O-ring 618. The O-ring 616 and the O-ring 618 form sealing surfaces on both sides of the inlet ports 596 of the filter assembly 588.

As noted above, the filter assembly 588 is not configured for installing in the water filtration system 100 described herein. For example, the upper circular connector 614 and the lower circular connector 612 do not have the appropriate shape to interface with the filter manifold assembly 402 and the filter bracket assembly 474, respectively.

Figure 18:
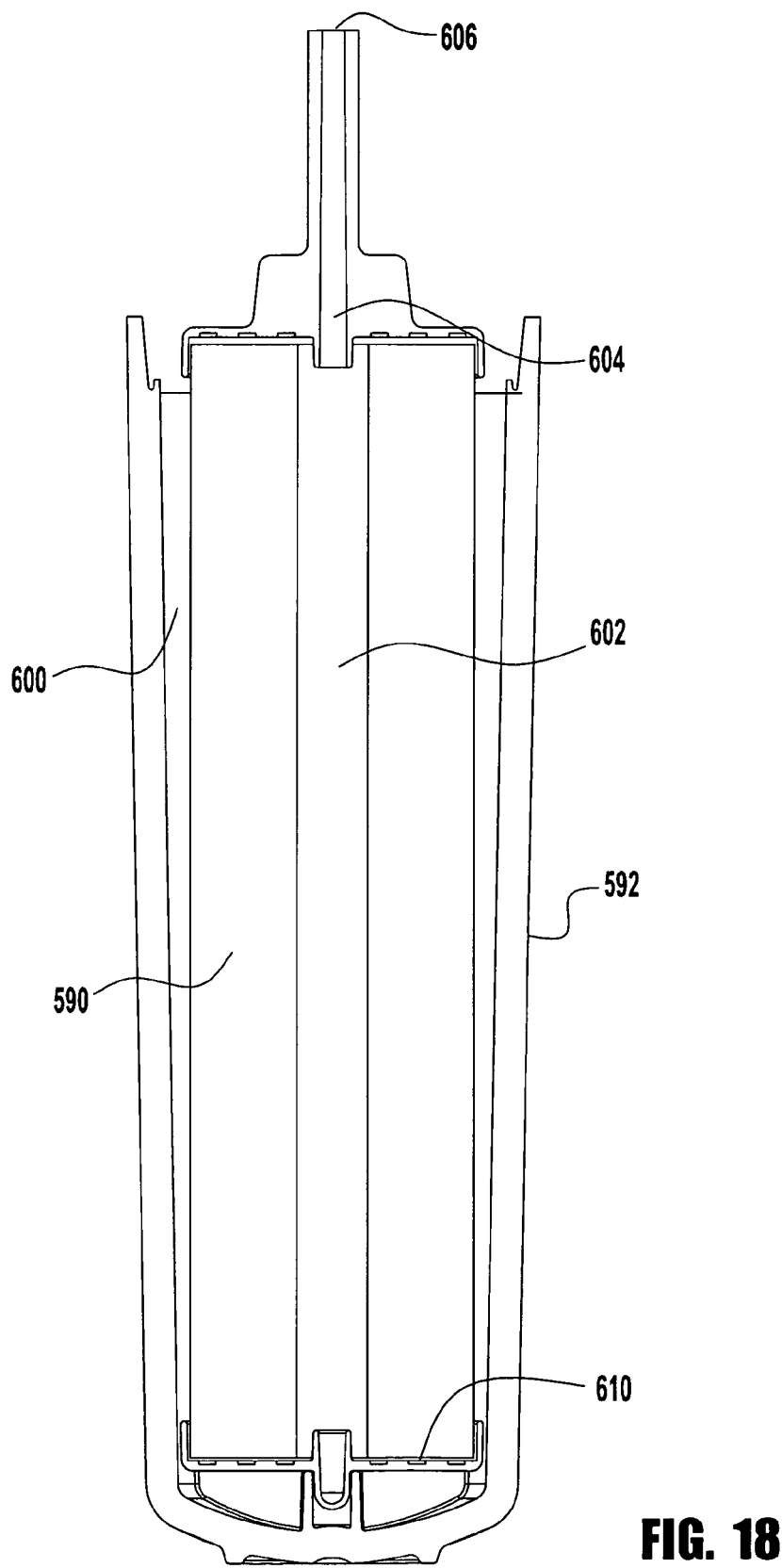
FIG. 18 is the cross-sectional view of the filter assembly of FIG. 17 with the cap portion removed.
Figure 19:
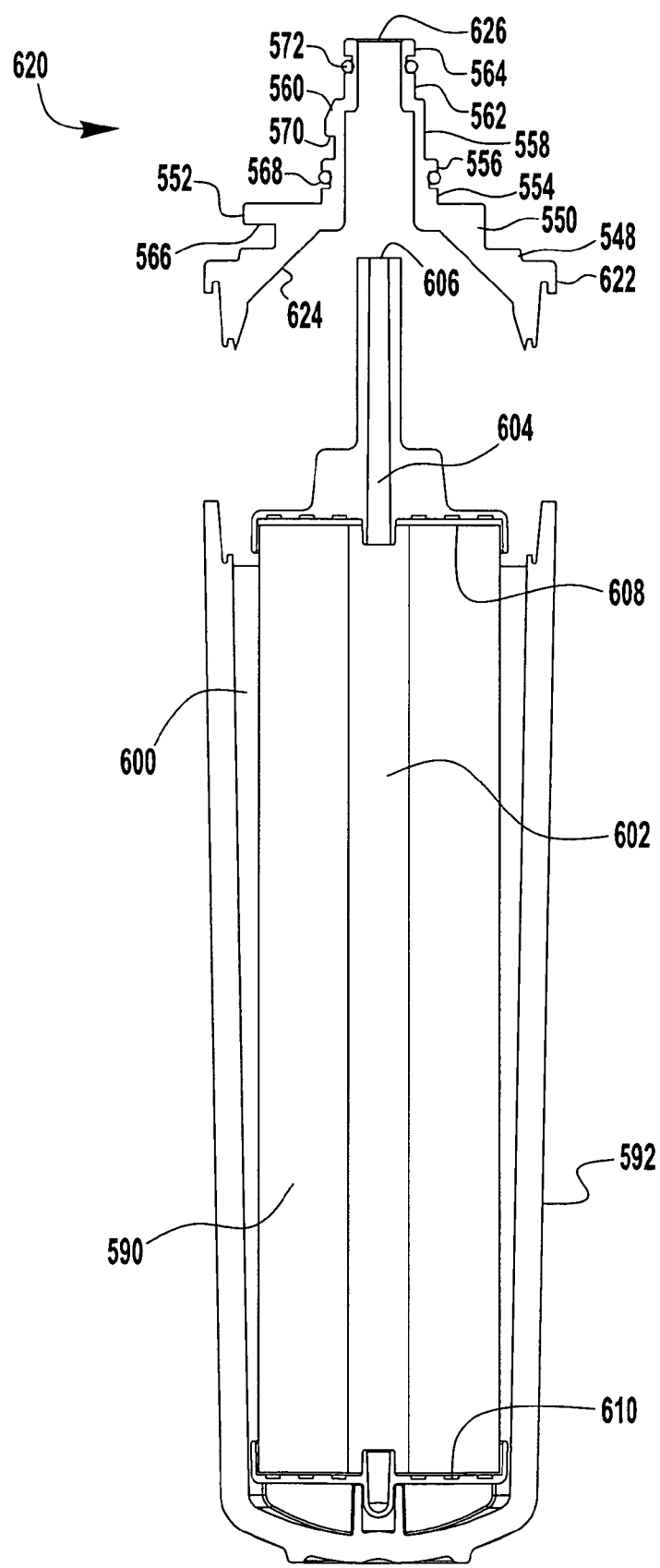
FIG. 19 is the cross-sectional view of the filtration assembly of FIG. 18 and a cross-sectional view of a filter adaptor assembly for replacing the removed cap portion.

Accordingly a filter adaptor assembly 620 (see FIG. 19) is provided to adapt the filter assembly 588 for installing in the water filtration system 100. In an exemplary embodiment, the filter adaptor assembly 620 is provided as a canister cap 622 that replaces the canister cap 594 of the filter assembly 588 to be adapted. FIG. 18 shows the filter assembly 588 with the canister cap 594 removed. FIG. 19 shows the canister cap 622 in position for connecting to the filter canister 592. Once the canister cap 622 is connected to the filter canister 592, the filter assembly 588 resembles the filter assembly 526 shown in FIGS. 12, 13 and 14.

The canister cap 622 may be connected to the filter canister 592 by any means sufficient to secure the canister cap 622 to the filter canister 592. For example, the canister cap 622 may be force fit into the filter canister 592 or the canister cap 622 and the filter canister 592 may be joined by use of an adhesive, connecting structure (e.g., complementary threads), molding process, etc. By replacing the canister cap 594 of the filter assembly 588 with the canister cap 622 of the filter adaptor assembly 620, the filter assembly 588 may be installed in the water filtration system 100.

The canister cap 594 may be difficult to separate from the filter canister 592. For example, the canister cap 594 may be fused with the filter canister 592 or formed integrally therewith. Accordingly, the filter adaptor assembly 620 may be provided as a sleeve that fits over at least a portion of the canister cap 594 instead of replacing the canister cap 594. If the filter adaptor assembly 620 is provided as the sleeve, an internal shape 624 of the filter adaptor assembly 620 conforms to an external shape of the canister cap 594 of the filter assembly 588. By sliding the filter adaptor assembly 620 acting as the sleeve over the canister cap 594, the filter assembly 588 may be installed in the water filtration system 100.

Whether provided as the replacement canister cap 622, the sleeve or some other suitable structure, the filter adaptor assembly 620 includes at least one non-circular connector for configuring the filter assembly 588 for installing in the water filtration system 100. In the exemplary embodiment shown in FIG. 19, the filter adaptor assembly 620 includes the canister cap 622. If the filter adaptor assembly 620 forms the sleeve, as described above, the canister cap 622 is replaced by a sleeve body (not shown) having the same elements formed thereon as in the case of the canister cap 622. These elements includes a first raised portion 548, a second raised portion 550, a lower connector 552, a lower lip 554, an upper lip 556, a lower shaft portion 558, an upper connector 560, a middle shaft portion 562 and an upper shaft portion 564. The canister cap 622 is hollow to accommodate the outlet waterway 604 extending through a central opening therein such that the outlet port 606 ends at an opening 626 formed in the upper shaft portion 564 of the canister cap 622.

Preferably, but not necessarily, the first raised portion 548 and the second raised portion 550 are circular. Preferably, but not necessarily, the circumference of the first raised portion 548 is greater than the circumference of the second raised portion 550. Preferably, but not necessarily, the height of the first raised portion 548 is less than the height of the second raised portion 550.

The lower connector 552 of the canister cap 622 is formed on the second raised portion 550. The lower connector 552 has a non-circular shape. Preferably, but not necessarily, the lower connector 552 has a multi-lobular shape (e.g., the tri-lobular shape illustrated in FIG. 12). Portions of the lower connector 552 extend over the second raised portion 550 to form overhanging portions 566 (see FIG. 14).

The lower lip 554 and the upper lip 556 of the canister cap 622 are formed above the lower connector 552. Preferably, but not necessarily, the lower lip 554 and the upper lip 556 are circular. Preferably, but not necessarily, the lower lip 554 and the upper lip 556 have the same circumference. A groove is defined between the lower lip 554 and the upper lip 556 for receiving an O-ring 568. The O-ring 568 forms a seal between the filter assembly 588 and the filter manifold assembly 402 when the filter assembly 588 is mounted in the water filtration system 100.

The lower shaft portion 558 is formed above the upper lip 556. Preferably, but not necessarily, the lower shaft portion 558 is circular. Preferably, but not necessarily, the circumference of the lower shaft portion 558 is less than the circumference of the upper lip 556.

The upper connector 560 of the canister cap 622 is formed on the lower shaft portion 558. The upper connector 560 has a non-circular shape. Preferably, but not necessarily, the upper connector 560 has a multi-lobular shape (e.g., the tri-lobular shape illustrated in FIG. 12). Portions of the upper connector 560 extend over the lower shaft portion 558 to form overhanging portions 570 (see FIG. 14).

The middle shaft portion 562 and the upper shaft portion 564 are formed above the upper connector 560. The upper shaft portion 564 receives the outlet port 606 for outputting filtered water from the filter assembly 588. Preferably, but not necessarily, the middle shaft portion 562 and the upper shaft portion 564 are circular. Preferably, but not necessarily, the circumference of the middle shaft portion 562 is less than the circumference of the lower shaft portion 558. Preferably, but not necessarily, the circumference of the upper shaft portion 564 is less than the circumference of the lower shaft portion 558. Preferably, but not necessarily, the middle shaft portion 562 and the upper shaft portion 564 have the same circumference. A groove is defined between the middle shaft portion 562 and the upper shaft portion 564 for receiving an O-ring 572. The O-ring 572 forms a seal between the filter assembly 588 and the dome barb 298 (in the filter manifold assembly 402) when the filter assembly 588 is mounted in the water filtration system 100.

The above description of specific embodiments has been given by way of example. From the disclosure given, those skilled in the art will not only understand the general inventive concept and its attendant advantages, but will also find apparent various changes and modifications to the structures and methods disclosed. It is sought, therefore, to cover all such changes and modifications as fall within the spirit and scope of the general inventive concept, as defined by the appended claims, and equivalents thereof.

What is claimed is:

1. A filter assembly for use in a water filtration system, said filter assembly comprising:
   a filter cartridge for filtering water;
   a filter canister for housing said filter cartridge;
   a substantially circular shaft extending from an end of said filter canister; and a multi-lobal connector extending from said shaft and having a plurality of lobes;
wherein said lobes extend substantially around an outer circumference of said shaft, and
wherein at least one of said lobes includes an inlet port for unfiltered water to flow into said filter canister.

2. The filter assembly of claim 1, wherein said multi-lobal connector is a one-piece connector.

3. The filter assembly of claim 1, wherein said filter canister is sealed with a canister cap and said shaft is formed on said canister cap.

4. The filter assembly of claim 1, wherein said shaft includes an outlet port for filtered water to flow out of said filter canister.

5. The filter assembly of claim 1, wherein said multi-lobal connector is a tri-lobal connector having three lobes.

6. The filter assembly of claim 1, wherein a plurality of ribs project from an inner surface of said filter canister to support said filter cartridge within said filter canister.

7. The filter assembly of claim 1, wherein said multi-lobal connector is located between a first portion of said shaft and a second portion of said shaft,
wherein said first portion of said shaft includes a groove for receiving a first sealing member, and
wherein said second portion of said shaft includes a groove for receiving a second sealing member.

8. The filter assembly of claim 7, wherein a distance between a centerline of said first sealing member and a centerline of said second sealing member is between 0.670 inches and 1.315 inches, inclusive.

9. The filter assembly of claim 7, wherein an outer diameter of said first sealing member is between 0.603 inches and 0.680 inches, inclusive.

10. The filter assembly of claim 7, wherein an outer diameter of said second sealing member is between 0.981 inches and 1.060 inches, inclusive.

11. A filter assembly for use in a water filtration system, said filter assembly comprising:
a filter cartridge for filtering water;
a filter canister for housing said filter cartridge;
a substantially circular shaft extending from an end of said filter canister; and
a tri-lobal connector extending from said shaft and having three lobes and three edges;
wherein said lobes extend substantially around an outer circumference of said shaft,
wherein each of said edges is formed where two adjacent lobes meet, and
wherein at least one of said lobes includes an inlet port for unfiltered water to flow into said filter canister.

12. A filter assembly for use in a water filtration system, said filter assembly comprising:
a filter cartridge for filtering water;
a filter canister for housing said filter cartridge;
a substantially circular shaft extending from an end of said filter canister;
a first tri-lobal connector extending from said shaft and having three first lobes and three first edges; and
a second tri-lobal connector extending from said shaft and having three second lobes and three second edges;
wherein said first lobes extend substantially around an outer circumference of said shaft,
wherein said second lobes extend substantially around an outer circumference of said shaft,
wherein each of said first edges is formed where two adjacent first lobes meet, and
wherein each of said second edges is formed where two adjacent second lobes meet.

13. The filter assembly of claim 12, wherein at least one of said first lobes includes an inlet port for unfiltered water to flow into said filter canister.

14. The filter assembly of claim 12, wherein said first lobes and said second lobes are aligned with one another.

15. The filter assembly of claim 12, wherein said first edges and said second edges are aligned with one another.

16. The filter assembly of claim 12, wherein a circumference of said first tri-lobal connector is substantially different from a circumference of said second tri-lobal connector.

* * * * *